United States Patent
Talebi Fard et al.

(10) Patent No.: US 11,706,705 B2
(45) Date of Patent: Jul. 18, 2023

(54) MULTIMEDIA PRIORITY SERVICE

(71) Applicant: Ofinno, LLC, Reston, VA (US)

(72) Inventors: Peyman Talebi Fard, Sterling, VA (US); Esmael Hejazi Dinan, McLean, VA (US); Jinsook Ryu, Oakton, VA (US); Kyungmin Park, Vienna, VA (US); Taehun Kim, Fairfax, VA (US); Weihua Qiao, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/360,087

(22) Filed: Jun. 28, 2021

(65) Prior Publication Data

US 2021/0410059 A1 Dec. 30, 2021

Related U.S. Application Data

(60) Provisional application No. 63/044,437, filed on Jun. 26, 2020.

(51) Int. Cl.
| | |
|---|---|
| H04W 80/02 | (2009.01) |
| H04W 48/18 | (2009.01) |
| H04W 88/18 | (2009.01) |
| H04L 69/24 | (2022.01) |
| H04W 40/12 | (2009.01) |
| H04W 76/10 | (2018.01) |

(52) U.S. Cl.
CPC ............. *H04W 48/18* (2013.01); *H04L 69/24* (2013.01); *H04W 40/12* (2013.01); *H04W 76/10* (2018.02); *H04W 80/02* (2013.01); *H04W 88/18* (2013.01)

(58) Field of Classification Search
CPC ..... H04W 48/18; H04W 40/12; H04W 76/10; H04W 80/02; H04W 88/18; H04W 76/12; H04W 28/0268; H04W 40/02; H04L 69/24; H04L 65/1016; H04L 65/1069; H04L 65/1073; H04L 65/80
See application file for complete search history.

(56) References Cited

U.S. PATENT DOCUMENTS

| | | | |
|---|---|---|---|
| 11,057,865 B1* | 7/2021 | Wong | H04W 68/005 |
| 2019/0174449 A1* | 6/2019 | Shan | H04W 60/00 |
| 2020/0267554 A1* | 8/2020 | Faccin | H04L 63/101 |
| 2022/0151004 A1* | 5/2022 | Sedlacek | H04W 8/082 |

OTHER PUBLICATIONS

3GPP (Priority indication over SBA interfaces via Message Priority header, S2-1811286, Oct. 2018).*
3GPP TS 22.153 V17.1.0 (Dec. 2019); 3rd Generation Partnership Project;Technical Specification Group Services and System Aspects; Multimedia priority service (Release 17).

(Continued)

*Primary Examiner* — Lakeram Jangbahadur
(74) *Attorney, Agent, or Firm* — Peter Flanagan; Kavon Nasabzadeh; Philip R. Smith

(57) ABSTRACT

A wireless device sends, to an access and mobility management function (AMF), a request for a multimedia priority service (MPS). The wireless device receives, from the AMF, a connection capability indication indicating network support for a connection of the wireless device for the MPS. The wireless device sends to the AMF, based on the connection capability indication, a request for a packet data unit (PDU) session establishment.

20 Claims, 32 Drawing Sheets

(56) References Cited

OTHER PUBLICATIONS

3GPP TS 22.261 V17.2.0 (Mar. 2020); 3rd Generation Partnership Project;Technical Specification Group Services and System Aspects; Service requirements for the 5G system; Stage 1 (Release 17).
3GPP TR 22.854 V17.1.0 (Dec. 2019); 3rd Generation Partnership Project;Technical Specification Group Services and System Aspects; Feasibility Study on Multimedia Priority Service—Phase 2; (Release 17).
3GPP TS 23.228 V16.4.0 (Mar. 2020); 3rd Generation Partnership Project; Technical Specification Group Services and System Aspects; IP Multimedia Subsystem (IMS); Stage 2 (Release 16).
3GPP TS 23.401 V16.6.0 (Mar. 2020); 3rd Generation Partnership Project; Technical Specification Group Services and System Aspects; General Packet Radio Service (GPRS) enhancements for Evolved Universal Terrestrial Radio Access Network (E-UTRAN) access; (Release 16).
3GPP TS 23.501 V16.4.0 (Mar. 2020); 3rd Generation Partnership Project; Technical Specification Group Services and System Aspects; System architecture for the 5G System (5GS); Stage 2 (Release 16).
S2-1811286; 3GPP TSG-SA WG2 Meeting #129; Dongguan, China, Oct. 15-19, 2018; Change Request; 23.502;CR 0770;rev1;Current version:15.3.0; Title: Priority indication over SBA interfaces via Message Priority header; Source to WG:Vencore Labs, OEC, AT&T, Sprint, FirstNet; Source to TSG: SA2; Work item code: 5GS_Ph1.
3GPP TS 23.502 V16.4.0 (Mar. 2020); 3rd Generation Partnership Project;Technical Specification Group Services and System Aspects; Procedures for the 5G System (5GS); Stage 2; (Release 16).
3GPP TS 23.503 V16.4.0 (Mar. 2020); 3rd Generation Partnership Project;Technical Specification Group Services and System Aspects; Policy and charging control framework for the 5G System (5GS); Stage 2; (Release 16).
3GPP TR 23.854 V11.0.0 (Jun. 2011); 3rd Generation Partnership Project;Technical Specification Group Services and System Aspects; Enhancements for Multimedia Priority Service (MPS); (Release 11).
3GPP TS 24.501 V16.3.0 (Dec. 2019); 3rd Generation Partnership Project;Technical Specification Group Core Network and Terminals; Non-Access-Stratum (NAS) protocol for 5G System (5GS); Stage 3; (Release 16).
3GPP TS 29.500 V1 6.3.0 (Mar. 2020); 3rd Generation Partnership Project; Technical Specification Group Core Network and Terminals; 5G System; Technical Realization of Service Based Architecture; Stage 3 (Release 16).
3GPP TS 38.331 V16.0.0 (Mar. 2020); 3rd Generation Partnership Project;Technical Specification Group Radio Access Network; NR; Radio Resource Control (RRC) protocol specification (Release 16).
C1-186039; 3GPP TSG-CT WG1 Meeting #112bis; Vilnius (Lithuania), Oct. 15-19, 2018; Title: Reply LS on establishment causes Response to: LS R2-1813465 on establishment causes; Release: Rel-15; Work Item: 5GS_Ph1-CT.
C1-192625 (was C1-192092); 3GPP TSG-CT WG1 Meeting #116; Xi'an, P.R. of China, Apr. 8-12, 2019; Change Request;24.501 CR 0947; Rev 1; Current Version 15.3.0; Title: Precedence between access identities for derivation of RRC establishment cause and for derivation of establishment cause for non-3GPP access; Source to WG: Qualcomm Incorporated, Huawei, HiSilicon; Source to TSG: C1; Work item code: 5GS_Ph1-CT.
C1-203079; 3GPP TSG-CT WG1 Meeting #124e; E-meeting, Jun. 2-10, 2020; Source: Perspecta Labs Title: New WID on Stage 3 of Multimedia Priority Service (MPS) Phase 2;Document for: Endorsement; Agenda Item: 17.1.1.
R2-1900002; 3GPP TSG-RAN WG2 meeting #105; Agenda Item: 2.2; Source: ETSI MCC; Title: Report of 3GPP TSG RAN2#104 meeting, Spokane, USA.
Tdoc R2-1900558 (resubmission of R2-1817223); 3GPP TSG-RAN WG2#105; Athens, Greece, Feb. 25-Mar. 1, 2019; Agenda Item: 10.4.1.3.10; Source: Ericsson; Title: T302 override or not for MPS and MCS?
R2-1902651 was R2-1902606; 3GPP TSG-RAN WG2 Meeting #105; Athens, Greece, Feb. 25-Mar. 1, 2019; Change Request; 38.300 CR 0142; Rev 2; Current Version 15.4.0.
S2-1900006 (revision of S2-1811663); SA WG2 Meeting #S2-130; Jan. 21-25, 2019, Kochi, India; Title: Reply LS on establishment causes; Response to: LS R2-1813465 on establishment causes; Release: Rel-15; Work Item: 5GS_Ph1-CT.
S2-1911018 (revision of SP-190629); SA WG2 Meeting #S2-136; Nov. 18-22, 2019, Reno, Nevada; Source: SA WG2; Title: Revised SID: Feasibility Study on Multimedia Priority Service (MPS) Phase 2, Stage 2; Document for: Approval; Agenda Item: 9.1; Work Item: FS_MPS2_St2.
S2-2000599; SA WG2 Meeting #S2-136AH; Jan. 13-17, 2020, Incheon, Korea; Source: Perspecta Labs;Title:New WID on Stage 2 of Multimedia Priority Service (MPS) Phase 2;Document for:Approval; Agenda Item: 9.1.
S2-2002063 (revision of S2-2000599); 3GPP TSG-WG SA2 Meeting #137E; Elbonia, Feb. 24-27, 2020; Source: Perspecta Labs;Title:New WID on Stage 2 of Multimedia Priority Service (MPS) Phase 2;Document for:Approval; Agenda Item: 9.1.
S2-2002595 (revision of S2-2002063); 3GPP TSG-WG SA2 Meeting #137E; Elbonia, Feb. 24-27, 2020; Source: Perspecta Labs;Title:New WID on Stage 2 of Multimedia Priority Service (MPS) Phase 2;Document for:Approval; Agenda Item: 9.1.
SP-190305; 3GPP TSG-SA Meeting #84; Newport Beach, CA, USA, Jun. 5-7, 2019; Source: SA1 (from S1-191447);Title: Proposed WID on Multimedia Priority Service (MPS) Phase 2;Document for: Approval;Agenda Item: 6.3.

* cited by examiner

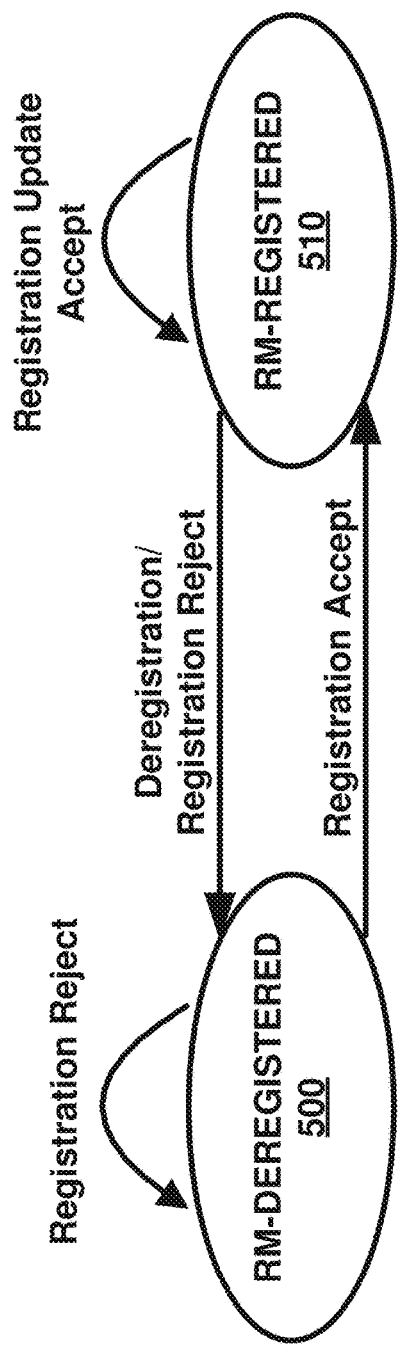
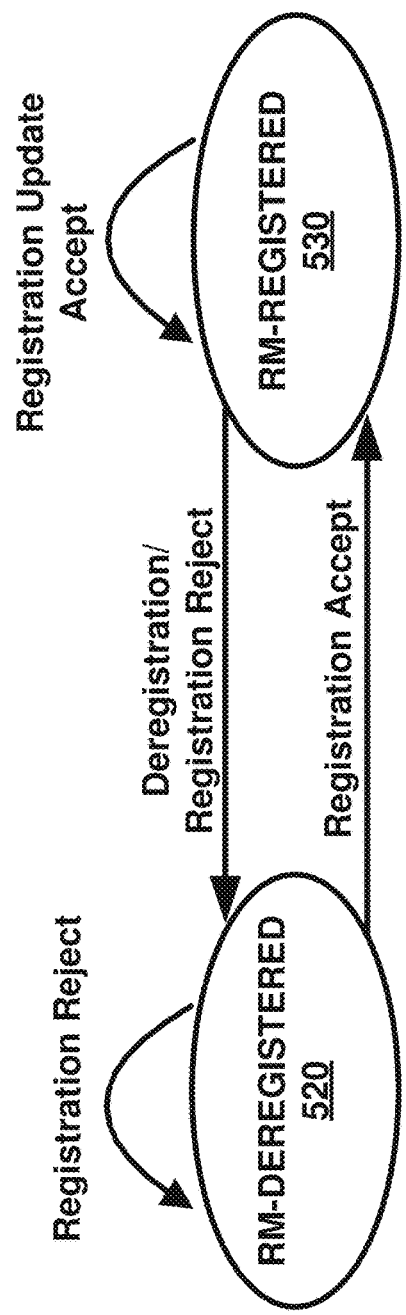
FIG. 5A
FIG. 5B

CM State Transition in UE

CM State Transition in AMF

Policy Association Establishment

UE policy part contents including a URSP rule

| |
|---|
| Precedence value of URSP rule (octet v+1) |
| Traffic descriptor (octets v+4 to w) |
| Traffic descriptor component type identifier<br>Bits<br>8 7 6 5 4 3 2 1<br>0 0 0 0 0 0 0 1   Match-all type<br>0 0 0 0 1 0 0 0   OS Id + OS App Id type<br>0 0 0 1 0 0 0 0   IPv4 remote address type<br>0 0 1 0 0 0 0 1   IPv6 remote address/prefix length type<br>0 0 1 1 0 0 0 0   Protocol identifier/next header type<br>0 1 0 1 0 0 0 0   Single remote port type<br>0 1 0 1 0 0 0 1   ...<br>...<br>...<br>1 0 0 0 0 1 1 1   Ethertype type<br>1 0 0 0 1 0 0 0   DNN type<br>1 0 0 1 0 0 0 0   Connection capabilities type<br>All other values are reserved. |
| "Connection capabilities" type:<br>Bits<br>8 7 6 5 4 3 2 1<br>0 0 0 0 0 0 0 1   IMS<br>0 0 0 0 0 0 1 0   MMS<br>0 0 0 0 0 1 0 0   SUPL<br>0 0 0 0 1 0 0 0   Internet<br>0 0 0 0 1 0 1 1   MPS / MPS for DTS<br><br>All other values are reserved. |

FIG. 25

*SIB1* message

```
-- ASN1START
-- TAG-SIB1-START

SIB1 ::=                  SEQUENCE {
    cellSelectionInfo         SEQUENCE {
        q-RxLevMin                Q-RxLevMin,
        q-RxLevMinOffset          INTEGER (1..8)                                          OPTIONAL,   -- Need S
        q-RxLevMinSUL             Q-RxLevMin                                              OPTIONAL,   -- Need R
        q-QualMin                 Q-QualMin                                               OPTIONAL,   -- Need S
        q-QualMinOffset           INTEGER (1..8)                                          OPTIONAL,   -- Cond Standalone
    }
    cellAccessRelatedInfo     CellAccessRelatedInfo,
    connEstFailureControl     ConnEstFailureControl                                       OPTIONAL,   -- Need R
    si-SchedulingInfo         SI-SchedulingInfo                                           OPTIONAL,   -- Need R
    servingCellConfigCommon   ServingCellConfigCommonSIB                                  OPTIONAL,   -- Need R
    ims-EmergencySupport      ENUMERATED {true}                                           OPTIONAL,   -- Need R
    eCallOverIMS-Support      ENUMERATED {true}                                           OPTIONAL,   -- Cond Absent
    ue-TimersAndConstants     UE-TimersAndConstants                                       OPTIONAL,   -- Need R
    uac-BarringInfo           SEQUENCE {
        uac-BarringForCommon      UAC-BarringPerCatList                                   OPTIONAL,   -- Need S
        uac-BarringPerPLMN-List   UAC-BarringPerPLMN-List                                 OPTIONAL,   -- Need S
        uac-BarringInfoSetList    UAC-BarringInfoSetList,
        uac-AccessCategory1-SelectionAssistanceInfo CHOICE {
            plmnCommon                UAC-AccessCategory1-SelectionAssistanceInfo,
            individualPLMNList        SEQUENCE (SIZE (2..maxPLMN)) OF UAC-AccessCategory1-SelectionAssistanceInfo
        }                                                                                 OPTIONAL,   -- Need S
    }                                                                                     OPTIONAL,   -- Need R
    useFullResumeID           ENUMERATED {true}                                           OPTIONAL,   -- Need R
    lateNonCriticalExtension  OCTET STRING                                                OPTIONAL,
    nonCriticalExtension      SIB1-v1610-IEs                                              OPTIONAL
}

SIB1-v1610-IEs ::=        SEQUENCE {
    idleModeMeasurements-r16  ENUMERATED {true}                                           OPTIONAL,   -- Need R
    posSI-SchedulingInfo-r16  PosSI-SchedulingInfo-r16                                    OPTIONAL,   -- Need R
    nonCriticalExtension      SEQUENCE {}                                                 OPTIONAL
}

UAC-AccessCategory1-SelectionAssistanceInfo ::=  ENUMERATED {a, b, c}

-- TAG-SIB1-STOP
-- ASN1STOP
```

FIG. 27

*CellAccessRelatedInfo* information element

```
-- ASN1START
-- TAG-CELLACCESSRELATEDINFO-START

CellAccessRelatedInfo ::=      SEQUENCE {
    plmn-IdentityList                  PLMN-IdentityInfoList,
    cellReservedForOtherUse            ENUMERATED {true}           OPTIONAL,    -- Need R
    ...,
    [[
    cellReservedForFutureUse-r16       ENUMERATED {true}           OPTIONAL,    -- Need R
    npn-IdentityInfoList-r16           NPN-IdentityInfoList-r16    OPTIONAL     -- Need R
    ]]
}

-- TAG-CELLACCESSRELATEDINFO-STOP
-- ASN1STOP
```

FIG. 28

MULTIMEDIA PRIORITY SERVICE

CROSS-REFERENCE TO RELATED APPLICATIONS

This application claims the benefit of U.S. Provisional Application No. 63/044,437, filed Jun. 26, 2020, which is hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A and FIG. 5B depict two registration management state models in UE 100 and AMF 155 as per an aspect of embodiments of the present disclosure.

FIG. 25 illustrates an example embodiment of a present disclosure.

FIG. 27 illustrates an example embodiment of a present disclosure.

FIG. 28 illustrates an example embodiment of a present disclosure.

DETAILED DESCRIPTION

Example embodiments of the present invention enable implementation of enhanced features and functionalities in 5G systems. More particularly, the embodiments of the technology positioning via user plane transmission (e.g. for 5G or future communication system). Throughout the present disclosure, UE, wireless device, vehicle terminal, and mobile device are used interchangeably. Throughout the present disclosure, base station, (Radio) Access Network ((R)AN), Next Generation Radio Access Network (NG-RAN), New radio Node B (gNB), Next Generation eNodeB (ng-eNBs) are used interchangeably. Throughout the present disclosure, base station, Radio Access Network (RAN), eNodeB are used interchangeably.

Figure 4:
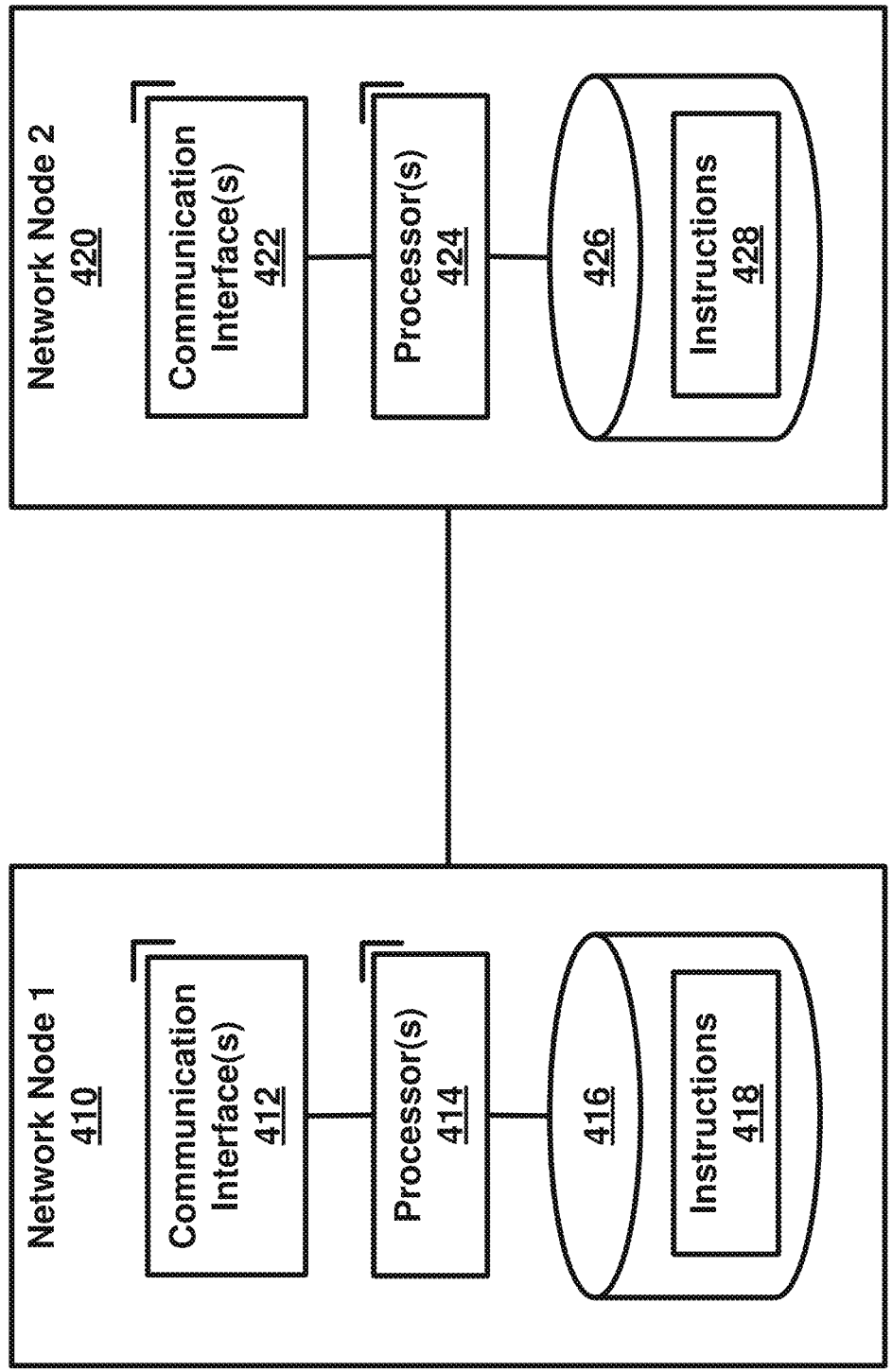
FIG. 4 is a system diagram of an example wireless device as per an aspect of an embodiment of the present disclosure.

Throughout the present disclosure, AMF, LMC, LMF, UDM, OAM, GMLC, LCS client, NEF and AF are example network functions which may be implemented either as a network element on a (dedicated) hardware, and/or a network node as depicted FIG. 4, or as a software instance running on a (dedicated) hardware and/or shared hardware, or as a virtualized function instantiated on an appropriate platform.

Figure 1:
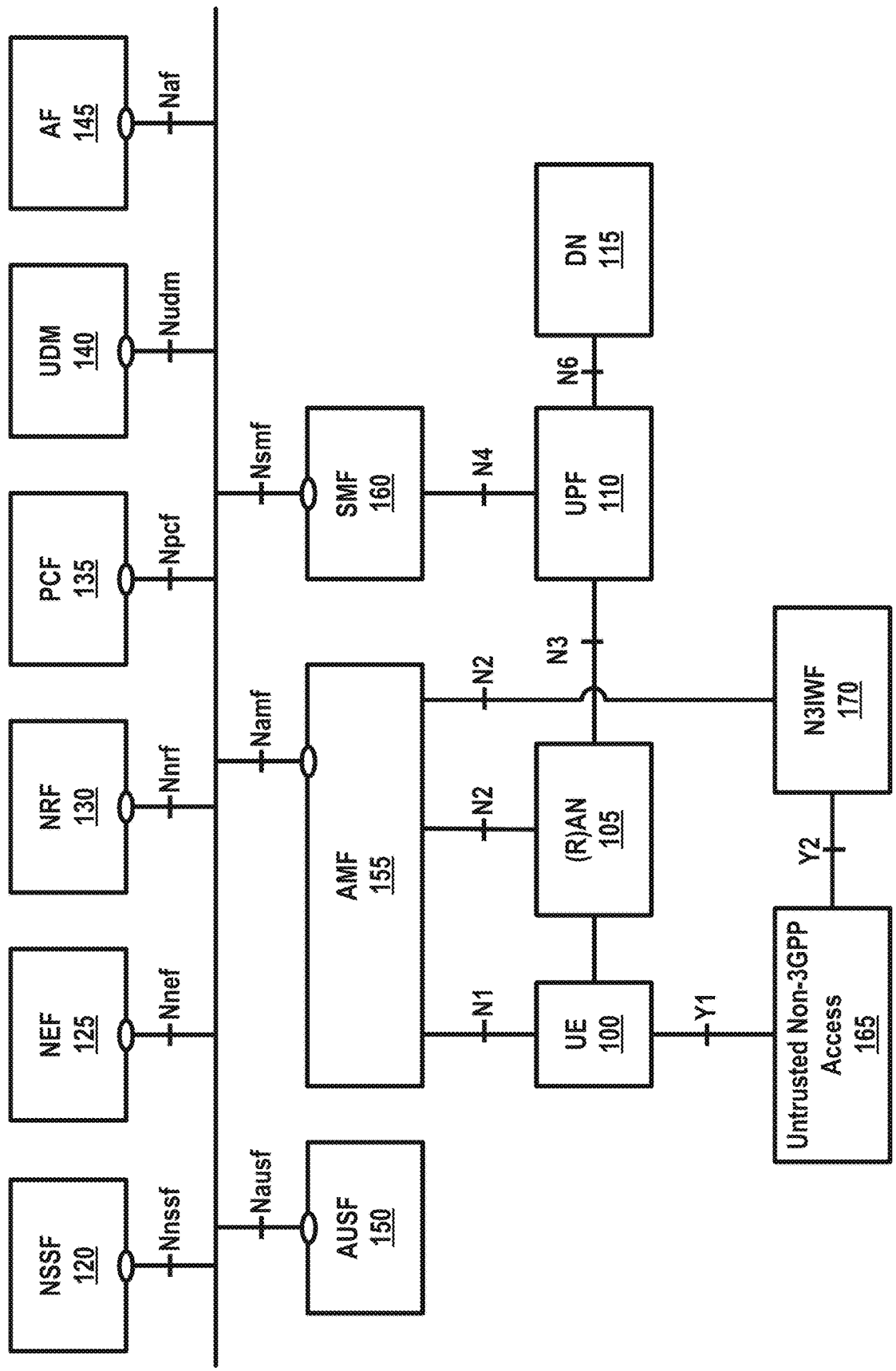
FIG. 1 is a diagram of an example 5G system architecture as per an aspect of an embodiment of the present disclosure.
Figure 2:
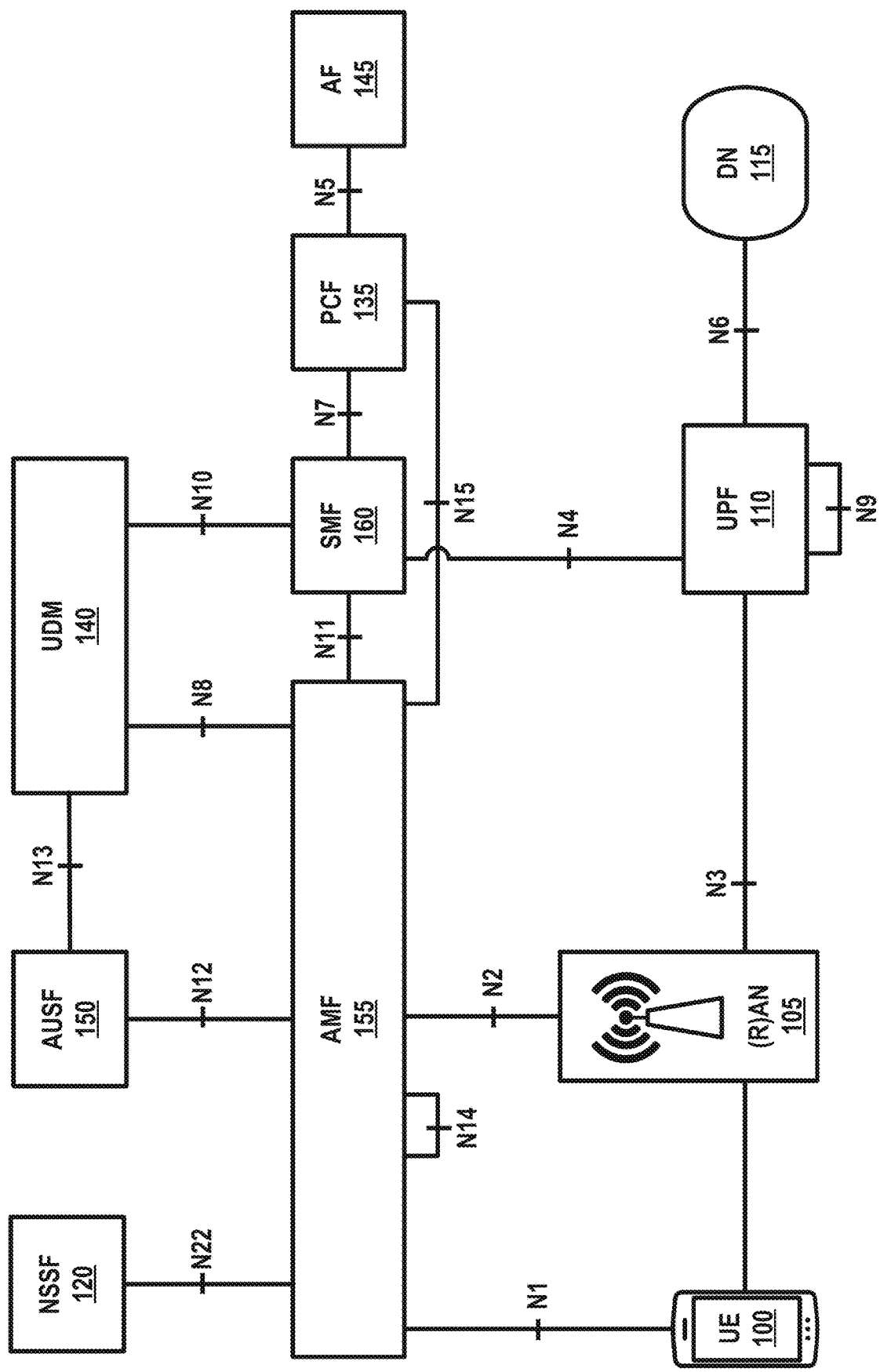
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
ACK Acknowledgement
AF Application Function
A-GNSS Assisted GNSS
AMBR Aggregate Maximum Bit Rate
AMF Access and Mobility Management Function
AN Access Network
ANDSP Access Network Discovery & Selection Policy
APN Access Point Name
ARP Allocation and Retention Priority
BD Billing Domain
BPS Barometric Pressure Sensor
CCNF Common Control Network Functions
CDR Charging Data Record
CHF Charging Function
CIoT Cellular IoT
CN Core Network CP Control Plane
C-V2X Cellular Vehicle-To-Everything
DAB Digital Audio Broadcasting
DDN Downlink Data Notification
DDoS Distributed Denial of Service
DL Downlink
DN Data Network
DN-AAA Data Network Authentication Authorization and Accounting
DNN Data Network Name
DTMB Digital Terrestrial Multimedia Broadcast
ECGI E-UTRAN Cell Global Identifier
ECID Enhanced Cell Identity
E-CSCF Emergency Call Session Control Function
eNodeB evolved Node B
EPS Evolved Packet System
E-UTRAN Evolved Universal Terrestrial Radio Access Network
FDD Frequency Division Duplex
FQDN Fully Qualified Domain Name
F-TEID Fully Qualified TEID
GAD Geographical Area Description
GMLC Gateway Mobile Location Centre
gNB Next Generation Node B
gNB-CU-CP gNB Central Unit Control Plane
GNSS Global Navigation Satellite System
GPSI Generic Public Subscription Identifier
GTP GPRS Tunneling Protocol
GUTI Globally Unique Temporary Identifier
GW Gateway
HGMLC Home GMLC
HTTP Hypertext Transfer Protocol
ID Identifier
IMEI International Mobile Equipment Identity
IMEI DB IMEI Database
IMS IP Multimedia Subsystem
IMSI International Mobile Subscriber Identity
IP Internet Protocol
IP-CAN IP Connectivity Access Network
L2 Layer 2 (data link layer)
L3 Layer 3 (network layer)
LADN Local Area Data Network
LAN local area network LCS LoCation Services LI Lawful Intercept LMC Location Management Component LMF Location Management Function LPP LTE Positioning Protocol LRF location retrieval function MAC Media Access Control MCS Mission Critical Service MEI Mobile Equipment Identifier MIB Master Information Block MICO Mobile Initiated Connection Only MME Mobility Management Entity MO Mobile Originated MO-LR Mobile Originated Location Request MPS Multimedia Priority Service MSISDN Mobile Subscriber ISDN MT Mobile Terminating MT-LR Mobile Terminated Location Request N3IWF Non-3GPP InterWorking Function NAI Network Access Identifier NAS Non Access Stratum NAT Network address translation NB-IoT Narrow Band IoT NCGI NR Cell Global Identity NEF Network Exposure Function NF Network Function NGAP Next Generation Application Protocol ng-eNB Next Generation eNB NG-RAN NR Radio Access Network NI-LR Network Induced Location Request NR New Radio NRF Network Repository Function NRPPa New Radio Positioning Protocol A NSI Network Slice Instance
NSSAI Network Slice Selection Assistance Information
NSSF Network Slice Selection Function
NWDAF Network Data Analytics Function
OAM Operation Administration and Maintenance
OCS Online Charging System
OFCS Offline Charging System
OTDOA Observed Time Difference of Arrival
PCC Policy and Charging Control
PCF Policy Control Function
PCRF Policy and Charging Rules Function
PDN Packet Data Network
PDU Packet Data Unit
PEI Permanent Equipment Identifier
PGW PDN Gateway
PLMN Public Land Mobile Network
ProSe Proximity-based Services
QFI QoS Flow Identifier
QoS Quality of Service
RM Registration Management
RA Random Access
RAN Radio Access Network
RAT Radio Access Technology
RRC Radio Resource Control
RM Registration Management
S1-AP S1 Application Protocol
SBA Service Based Architecture
SCM Security Context Management
SEA Security Anchor Function
SET SUPL Enabled Terminal
SGW Serving Gateway
SIB System Information Block
SLP SUPL Location Platform
SM Session Management
SMF Session Management Function
SMSF SMS Function
S-NSSAI Single Network Slice Selection Assistance information
SS Synchronization Signal
SSC Session and Service Continuity
SUCI Served User Correlation ID
SUPI Subscriber Permanent Identifier
SUPL Secure User Plane Location
TA Tracking Area
TAI Tracking Area Identity
TBS Terrestrial Beacon System
TCP Transmission Control Protocol
TEID Tunnel Endpoint Identifier
TMSI Temporary Mobile Subscriber Identity
TNAN Trusted Non-3GPP Access Network
TNGF Trusted Non3GPP Gateway
TRP Transmission and Reception Point
UCMF UE radio Capability Management Function
UDR Unified Data Repository
UDM Unified Data Management
UDP User Datagram Protocol
UE User Equipment
UL Uplink
UL CL Uplink Classifier
UPF User Plane Function
V2X Vehicle-To-Everything
WLAN Wireless Local Area Network
XML Extensible Markup Language Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
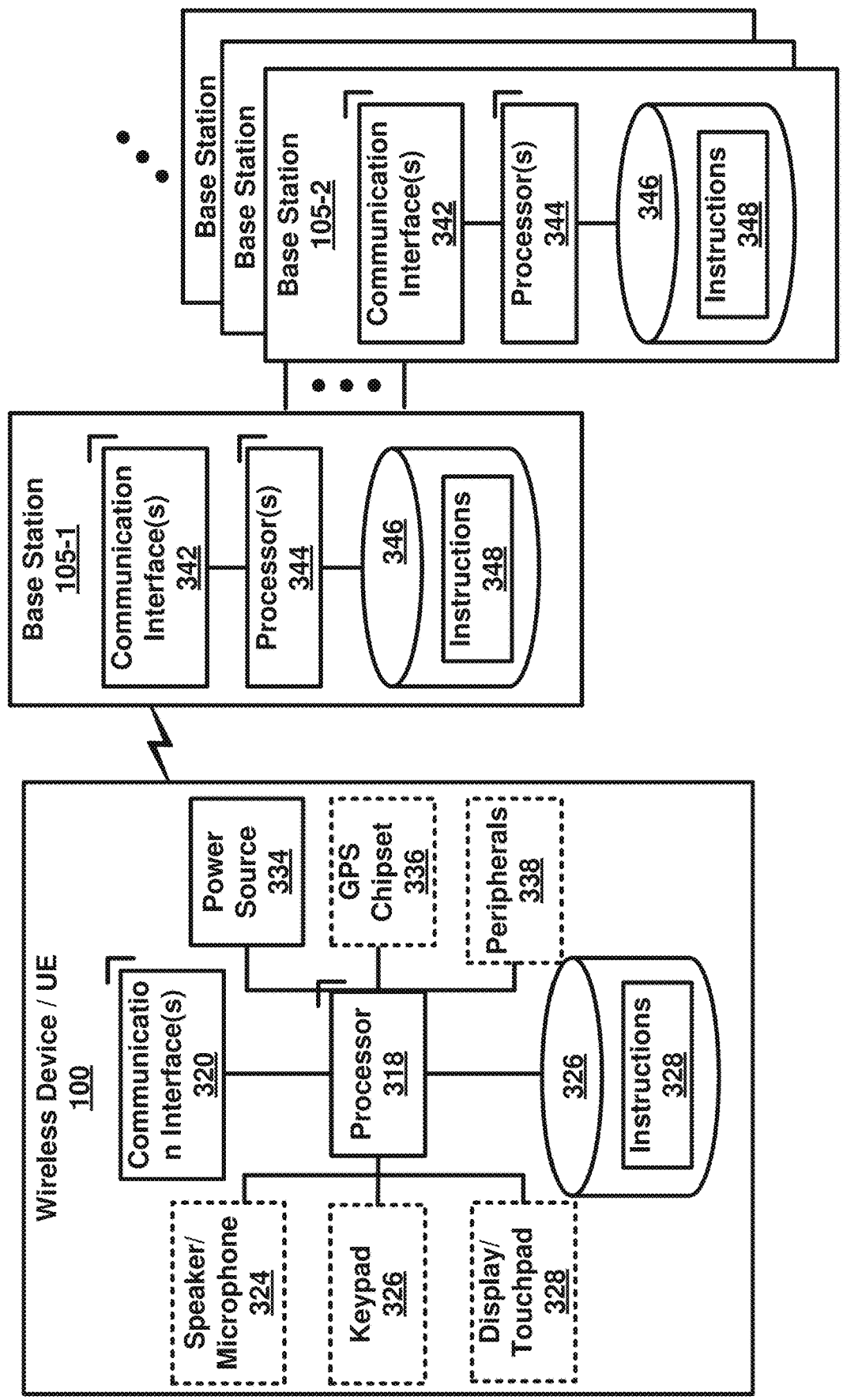
FIG. 3 is a system diagram of an example wireless device and a network node in a 5G system as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive network function (NF) discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(s) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
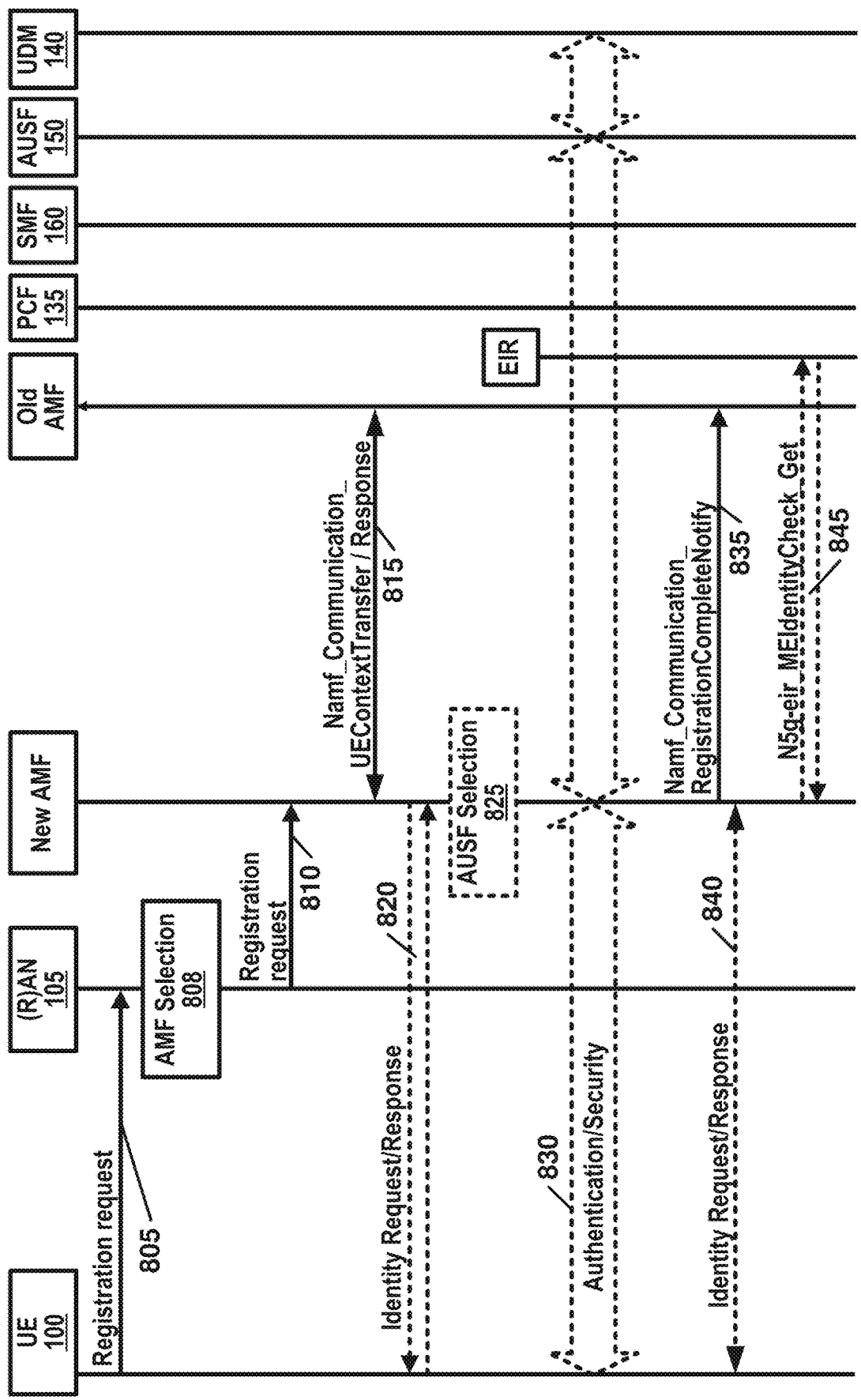
FIG. 8 is an example call flow for registration procedure as per an aspect of an embodiment of the present disclosure.
Figure 9:
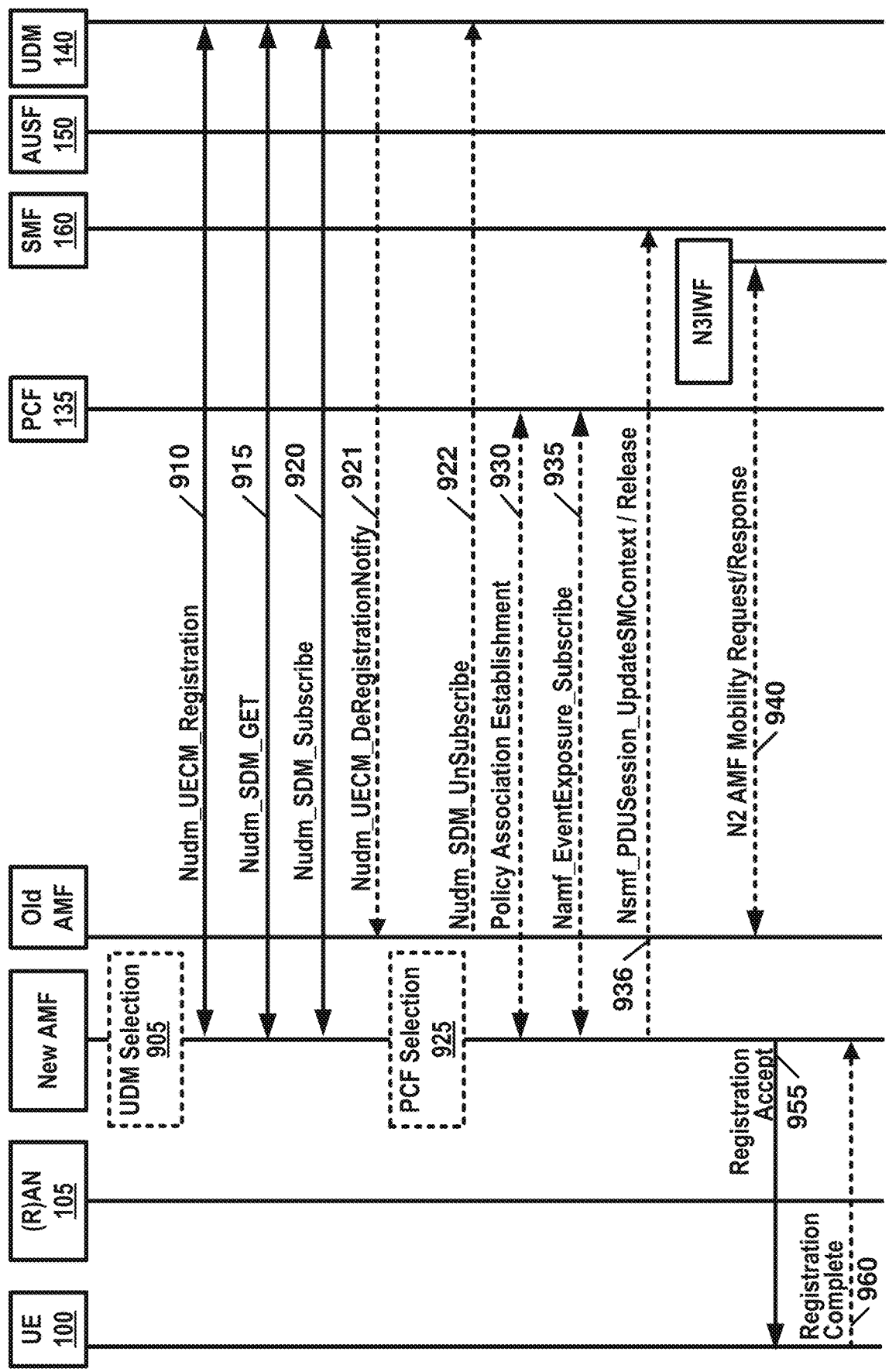
FIG. 9 is an example call flow for registration procedure as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

Figure 6A:
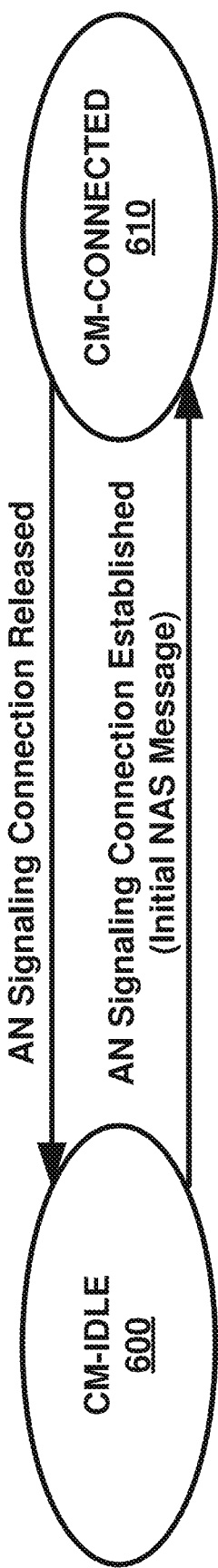
FIG. 6A and FIG. 6B depict two connection management state models in UE 100 and AMF 155 as per an aspect of embodiments of the present disclosure.
Figure 6B:
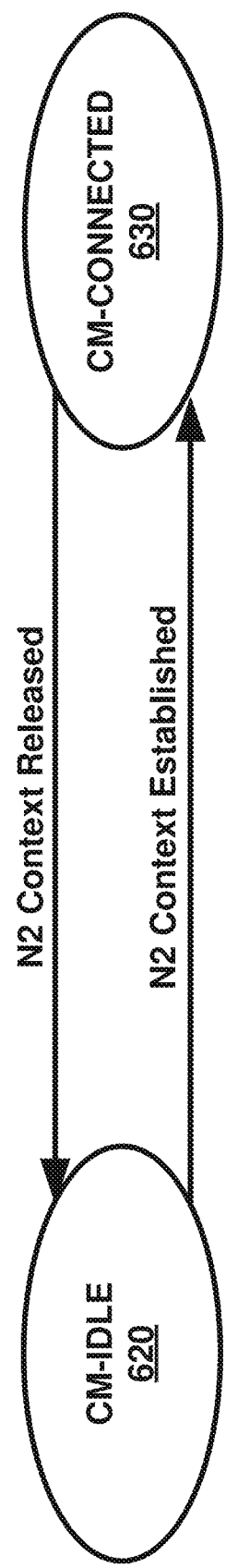

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the signaling connection between the UE 100 and the (R)AN 105 (e.g. RRC connection over 3GPP access) and the N2 connection for the UE 100 between the and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server (AS), the 5GC may be able to trigger a specific application in the UE 100. When receiving the trigger, the UE 100 may send it to the identified application in the UE 100. The identified application in the UE 100 may establish a PDU session to a specific DNN.

Figure 7:
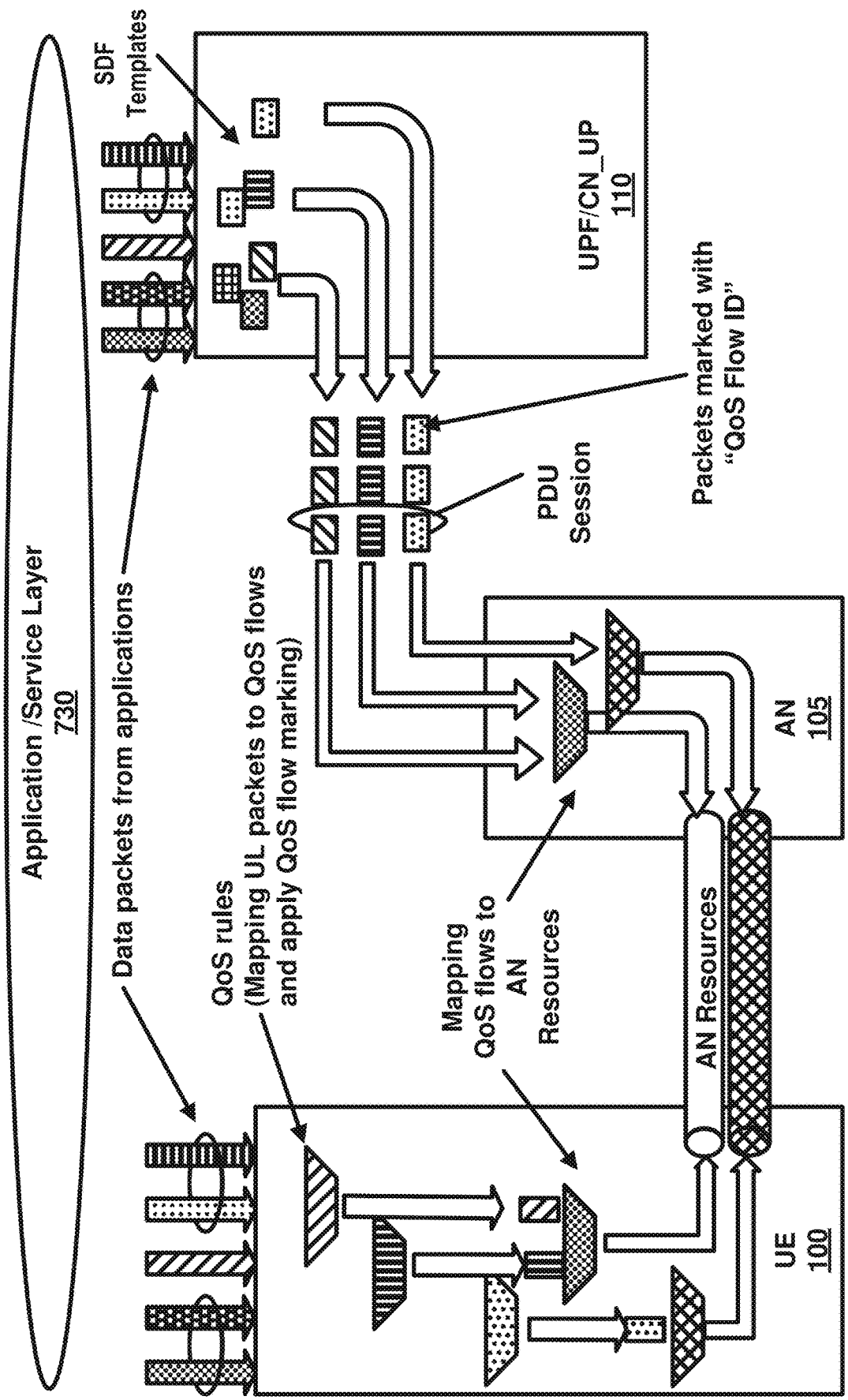
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 should be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to the a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by each PLMN based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the parameters may include e.g. SUCI or SUPI or the 5G-GUTI, the Selected PLMN ID and requested NSSAI, and/or the like. In an example, the parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of each S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by each NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(*s*) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may select a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID. If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 a Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of each S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
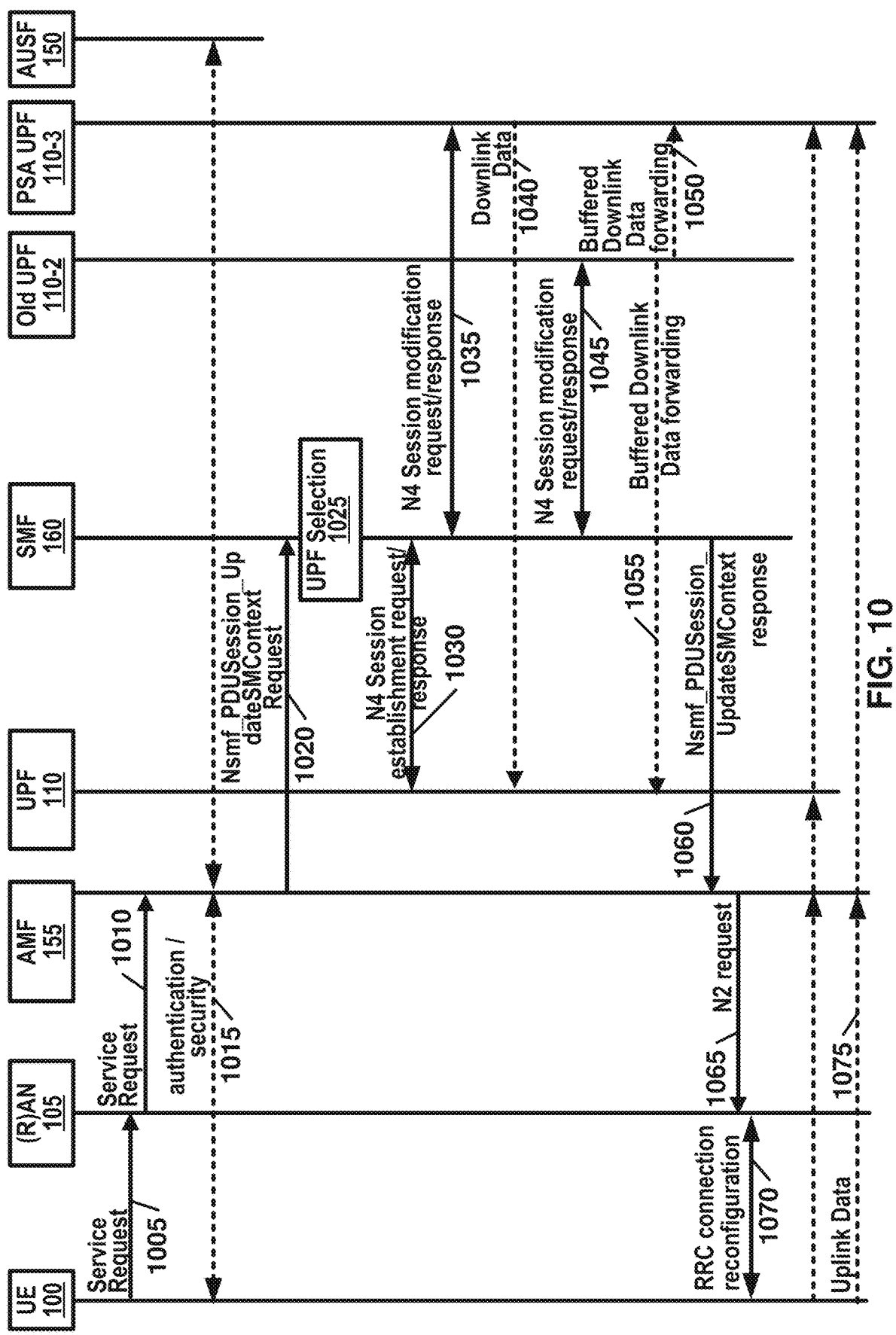
FIG. 10 is an example call flow for service request procedure as per an aspect of an embodiment of the present disclosure.
Figure 11:
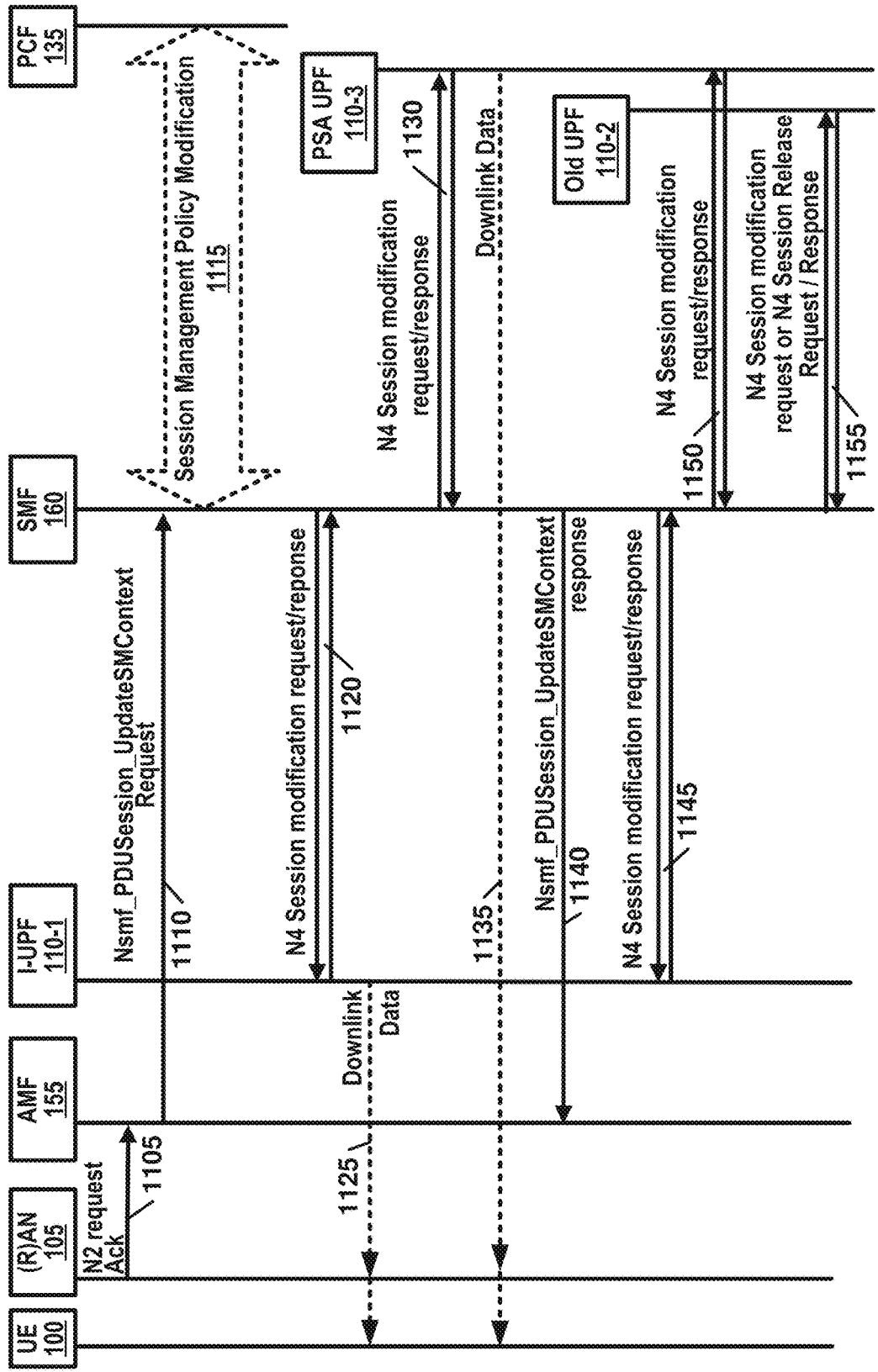
FIG. 11 is an example call flow for service request procedure as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s); may select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of thechor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSM-Context response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSM-Context response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSM-Context response service operations from all the SMF 160s associated with the UE 100 may be received. In such case, the N2 request message may include the N2 SM information received in each of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that me be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
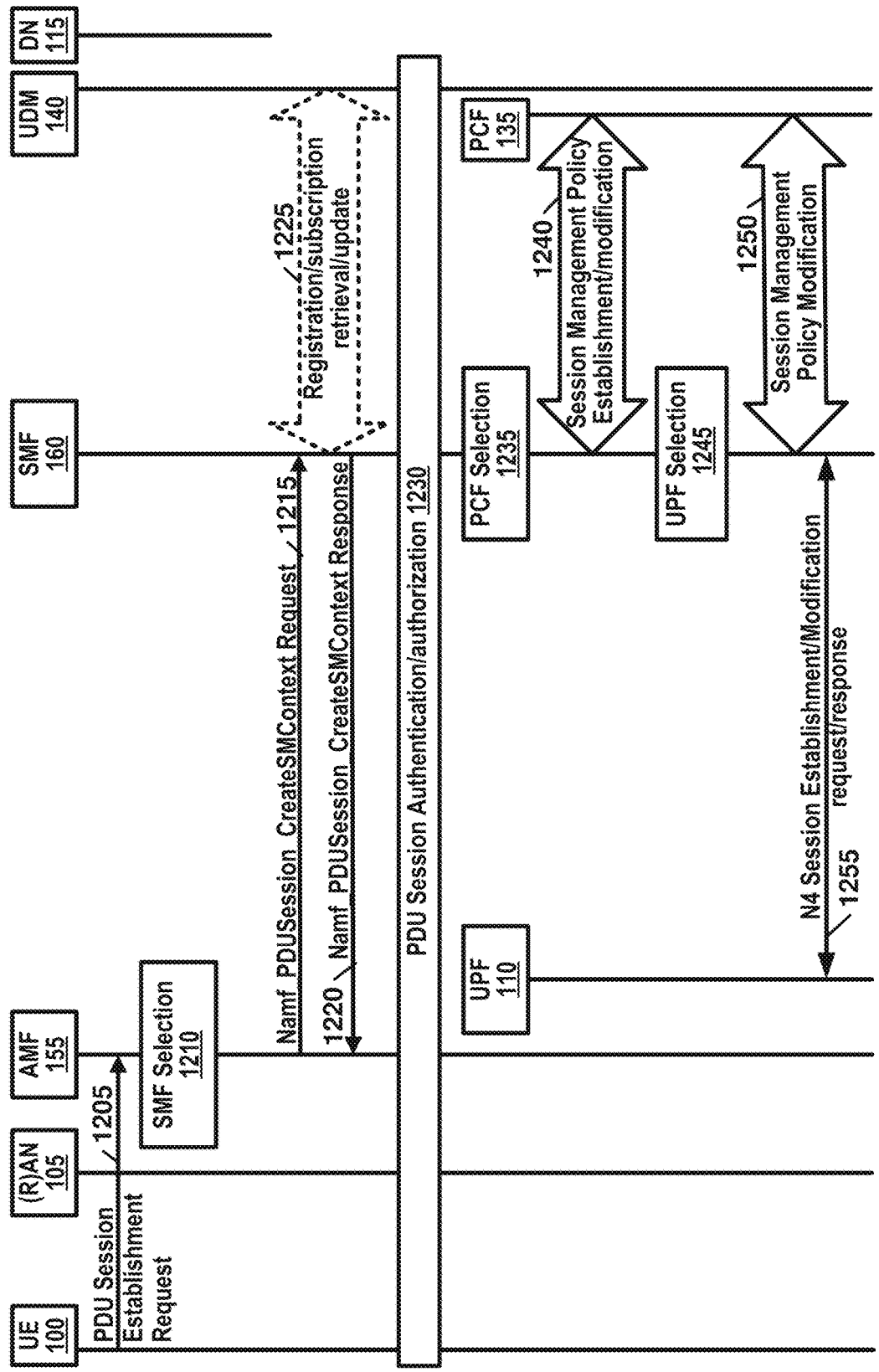
FIG. 12 is an example call flow for PDU session establishment procedure as per an aspect of an embodiment of the present disclosure.
Figure 13:
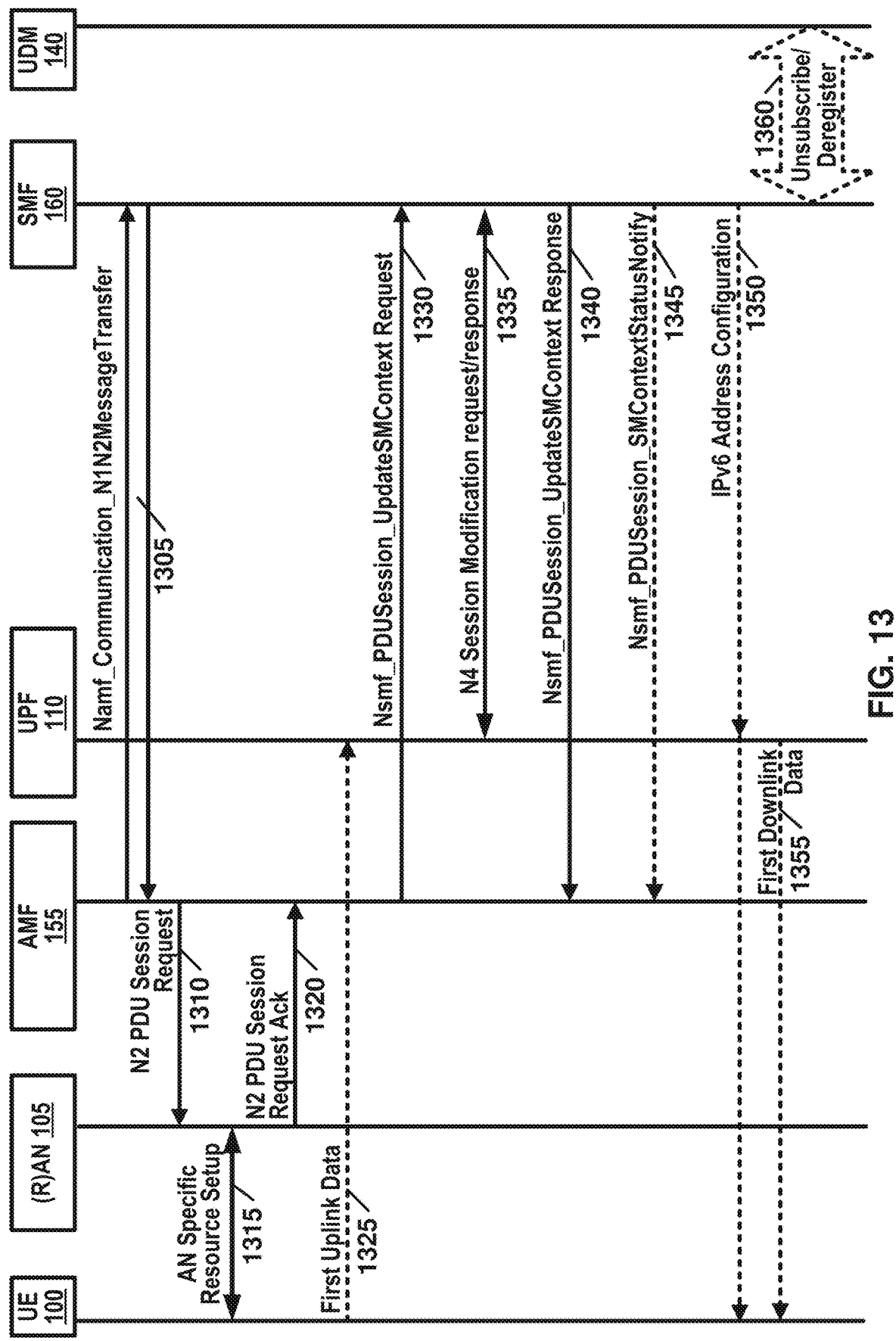
FIG. 13 is an example call flow for PDU session establishment procedure as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSM-Context request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g when request type indicates initial request), the AMF 155 may invoke the Nsmf_PDUSession_CreateSMContext request, but if the AMF 155 already has an association with an SMF 160 for the PDU session ID provided by the UE 100 (e.g when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with each UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The tunnel info may comprise a tunnel endpoint for each involved RAN 105 node, and the QFIs assigned to each tunnel endpoint. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure- _Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify(release) 1345. The SMF 160 may releases any N4 session(s) created, any PDU session address if allocated (e.g IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
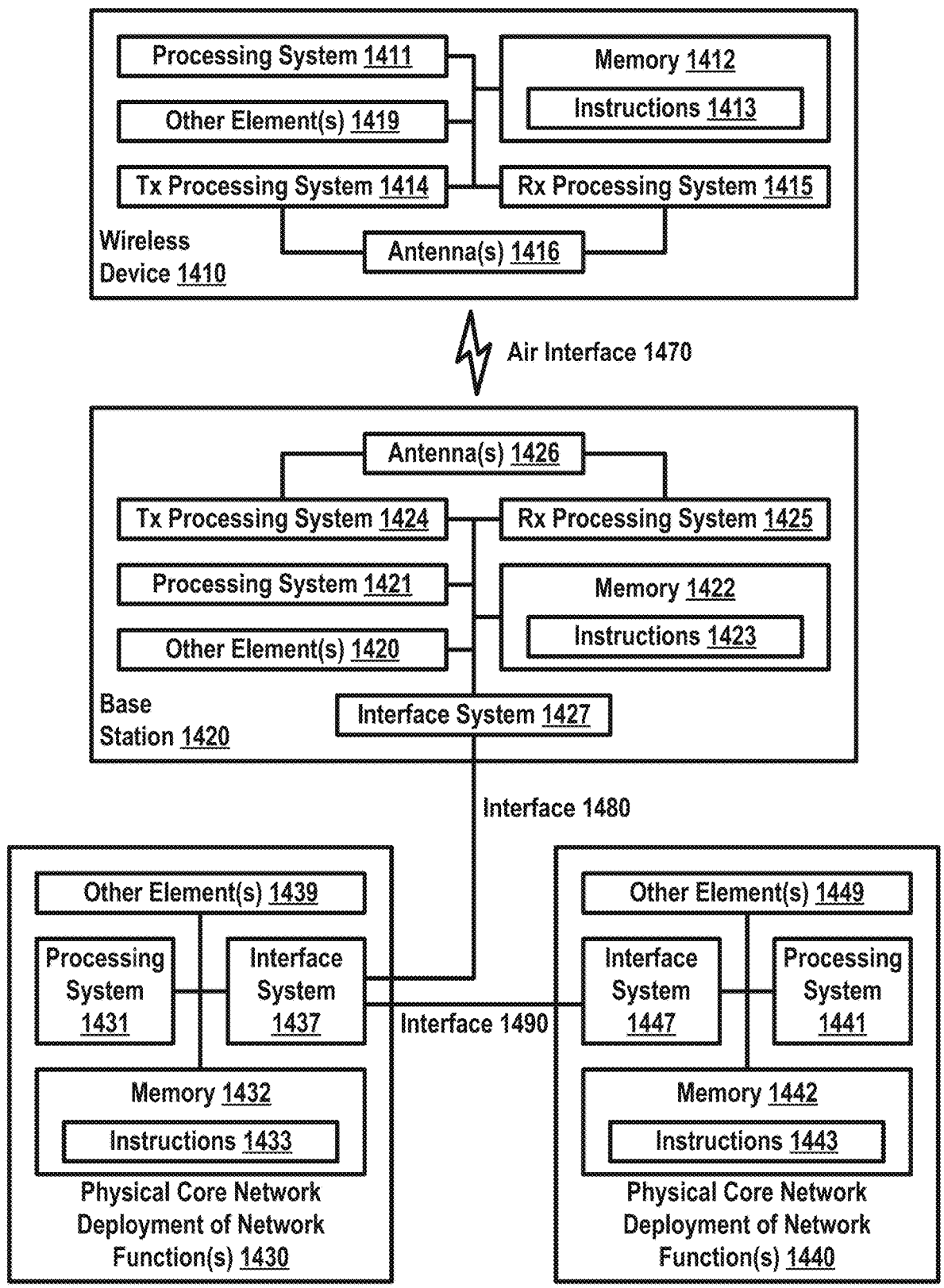
FIG. 14 illustrates an example mobile communication networks as per an aspect of an embodiment of the present disclosure.

FIG. 14 illustrates another example of a mobile communication network in which embodiments of the present disclosure may be implemented. The mobile communication network depicted in FIG. 14 includes a wireless device 1410, a base station 1420, a physical core network deployment of one or more network functions 1430 (henceforth "CN deployment 1430"), and a physical core network deployment of one or more network functions 1440 (henceforth "CN deployment 1440"). The deployment 1430 and the deployment 1440 may be elements of a core network.

The wireless device 1410 may communicate with the base station 1420 over an air interface 1470. The communication direction from the wireless device 1410 to the base station 1420 over the air interface is known as uplink, and the communication direction from the base station 1420 to the wireless device 1410 over the air interface 1470 is known as downlink. Downlink transmissions may be separated from uplink transmissions using FDD, TDD, and/or some combination of the two duplexing techniques. FIG. 14 shows a single wireless device 1410 and a single base station 1420, but it will be understood that the wireless device 1410 may communicate with any number of base stations or other access network components over the air interface 1470, and that the base station 1420 may communicate with any number of wireless devices over the air interface 1470.

The wireless device 1410 may comprise a processing system 1411 and a memory 1412. The memory 1412 may comprise one or more computer-readable media, for example, one or more non-transitory computer readable media. The memory 1412 may include instructions 1413. The processing system 1411 may process and/or execute the instructions 1413. Processing and/or execution of the instructions 1413 may cause the processing system 1411 to perform one or more functions or activities. The memory 1412 may include data (not shown). One of the functions or activities performed by the processing system 1411 may be to store data in the memory 1412 and/or retrieve previously-stored data from the memory 1412. In an example, downlink data received from the base station 1420 may be stored in the memory 1412, and uplink data for transmission to the base station 1420 may be retrieved from the memory 1412. The wireless device 1410 may communicate with the base station 1420 using a transmission processing system 1414 and a reception processing system 1415. The wireless device 1410 may comprise one or more antennas 1416 to access the air interface 1470. Although not shown in FIG. 14, the transmission processing system 1414 and/or the reception processing system 1415 may be coupled to a dedicated memory that is analogous to but separate from the memory 1412, and comprises instructions that may be processed and/or executed to carry out one or more of their respective functionalities.

The wireless device 1410 may comprise one or more other elements 1419. The one or more other elements 1419 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1410 may receive user input data from and/or provide user output data to the one or more one or more other elements 1419. The one or more other elements 1419 may comprise a power source. The wireless device 1410 may receive power from the power source and may be configured to distribute the power to the other components in the wireless device 1410. The power source may comprise one or more sources of power, for example, a battery, a solar cell, a fuel cell, or any combination thereof.

The wireless device 1410 may transmit data to the base station 1420 via the air interface 1470. To perform the transmission, the processing system 1411 may implement layer 3 and layer 2 open systems interconnection (OSI) functionality to process the data for uplink transmission. Layer 3 may include a radio resource control layer (RRC). Layer 14 may include a service data application protocol layer (SDAP), a packet data convergence protocol layer (PDCP), a radio link control layer (RLC), and a media access control layer (MAC). The data may be provided to the transmission processing system 1414, which may implement layer 1 OSI functionality. Layer 1 may include a physical layer (PHY). The wireless device 1410 may transmit the data over the air interface 1470 using one or more antennas 1416. For scenarios where the one or more antennas 1416 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The wireless device 1410 may receive downlink data from the base station 1420 over the air interface 1470. The downlink data may be received via the one or more antennas 1416. The reception processing system 1415 may implement layer 1 OSI functionality on the received downlink data and may provide the data to the processing system 1411. The processing system 1411 may implement layer 2 and layer 3 OSI functionality to process the received downlink data. The base station 1420 may comprise elements analogous to the elements of the wireless device 1410. The base station 1420 may comprise a processing system 1421 and a memory 1422. The memory 1422 may comprise one or more computer-readable media, for example, one or more non-transitory computer readable media. The memory 1422 may include instructions 1423. The processing system 1421 may process and/or execute the instructions 1423. Processing and/or execution of the instructions 1423 may cause the processing system 1421 to perform one or more functions or activities. The memory 1422 may include data (not shown). One of the functions or activities performed by the processing system 1421 may be to store data in the memory 1422 and/or retrieve previously-stored data from the memory 1422. The base station 1420 may communicate with the wireless device 1410 using a transmission processing system 1424 and a reception processing system 1425. The base station 1420 may comprise one or more antennas 1426 to access the air interface 1470. The processing system 1421 may implement layer 14 and layer 3 OSI functionality. The transmission processing system 1424 and the reception processing system 1425 may implement layer 1 OSI functionality to perform transmission of downlink data and reception of uplink data, respectively.

The base station 1420 may comprise an interface system 1427. The interface system 1427 may communicate with one or more elements of the core network via an interface 1480. The interface 1480 may be wired and/or wireless and the interface system 1427 may include one or more components suitable for communicating via the interface 1480. In FIG. 14, the interface 1480 connects the base station 1420 to a single CN deployment 1430, but it will be understood that the wireless device 1410 may communicate with any number of CN deployments over the interface 1480, and that the CN deployment 1430 may communicate with any number of base stations over the interface 1480. The base station 1420 may comprise one or more other elements 1429 analogous to one or more of the one or more other elements 1419.

The CN deployment 1430 may comprise one or more network functions (NFs). For example, the CN deployment 1430 may comprise an AMF and/or a UPF analogous to the AMF and UPF depicted in FIG. 1. The CN deployment 1430 may comprise elements analogous to the elements of the wireless device 1410 and the base station 1420, as described above. The CN deployment 1430 may comprise a processing system 1431 and a memory 1432. The memory 1432 may comprise one or more computer-readable media, for example, one or more non-transitory computer readable media. The memory 1432 may include instructions 1433. The processing system 1431 may process and/or execute the instructions 1433. Processing and/or execution of the instructions 1433 may cause the processing system 1431 to perform one or more functions or activities. The memory 1432 may include data (not shown). One of the functions or activities performed by the processing system 1431 may be to store data in the memory 1432 and/or retrieve previously-stored data from the memory 1432. The CN deployment 1430 may access the interface 1480 using an interface system 1437. The CN deployment 1430 may also use the interface system 1437 to access an interface 1490. The CN deployment 1430 may use the interface 1490 to communicate with one or more data networks (analogous to, for example, the DN(s) depicted in FIG. 1 and/or one or more other CN deployments, including the CN deployment 1440 depicted in FIG. 14. The CN deployment 1430 may comprise one or more other elements 1439.

The CN deployment 1440 may comprise elements analogous to the elements of the CN deployment 1430, as described above. The CN deployment 1440 may comprise a processing system 1441 and a memory 1442. The memory 1442 may comprise one or more computer-readable media, for example, one or more non-transitory computer readable media. The memory 1442 may include instructions 1443. The processing system 1441 may process and/or execute the instructions 1443. Processing and/or execution of the instructions 1443 may cause the processing system 1441 to perform one or more functions or activities. The memory 1442 may include data (not shown). One of the functions or activities performed by the processing system 1441 may be to store data in the memory 1442 and/or retrieve previously-stored data from the memory 1442. The CN deployment 1440 may access the interface 1490 using an interface system 1447. The CN deployment 1440 may comprise one or more other elements.

The processing system 1411, the processing system 1421, the processing system 1431, and/or the processing system 1441 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1411, the processing system 1421, the processing system 1431, and/or the processing system 1441 may perform signal coding/processing, data processing, power control, input/output processing, and/or any other functionality that may enable the wireless device 1410, base station 1420, CN deployment 1430, and/or CN deployment 1440 to operate in a mobile communications system.

Each CN deployment may comprise one or more network functions. Depending on the context in which the term is used, a network function (NF) may refer to a particular set of functionalities and/or one or more physical elements configured to perform those functionalities (e.g., a processing system and memory comprising instructions that, when executed by the processing system, cause the processing system to perform the functionalities). There are many different types of NF and each type of NF may be associated with a different set of functionalities. Different NFs may be flexibly deployed at different locations (for example, in different physical core network deployments) or in a same location (for example, co-located in the same physical core network deployment). Moreover, physical CN deployment are not limited to implementation of NFs. For example, a particular physical CN deployment may further include a base station or portions therefor and/or a data network or portions thereof. Accordingly, one or more NFs implemented on a particular physical core network deployment may be co-located with one or more non-core elements, including elements of an access network or data network.

Many cellular networks support Multimedia Priority Service (MPS). MPS may provide service users priority access to radio and core network resources. Priority access may increase the probability of the service user's voice, video, and/or data communication session being successful. A service user (or MPS service user) may be a user who has received a priority level assignment. A service user may receive the priority level assignment from an agency authorized to issue priority level assignments (e.g., a regional or national authority or government). A service user may be a human service user, such as a government, security, or special service user who needs to establish and maintain communications via a cellular network during situations where public safety and security may be at risk. In addition or alternatively, a service user may be a non-human user, such as a specialized application using MPS through machine interactions (e.g., in the case of IoT).

A 5G system that supports MPS may provide priority treatment to an authorized service user using a UE with an MPS subscription. In this case, MPS subscription related information may be stored in the UE and used to gain priority access to the 5G system. For example, membership in a special access class may be stored in the UE and used for E-UTRAN access to the EPC and/or membership in Access Identity 1 may be stored in the UE and used for 5G system access (NR and E-UTRA access to the 5GC). A UE with an MPS subscription may be referred to as an MPS subscribed UE. A UE without an MPS subscription may be a UE without a subscription to MPS (such as a public UE, and/or the like).

In an example, MPS for Data Transport Service (DTS) may be a generic priority packet transport service that is applied independent of the specific data application being used to provide priority to those applications using the default bearer (EPS) or default QoS flow (5G system).

A 5G system that supports MPS may provide priority treatment to an authorized service user using a UE that does not have an MPS subscription (e.g., a public UE or non-MPS subscribed UE). In this case, the service user is not identified by the subscription related information stored in the UE. In this case, radio interface priority may not be provided for an initial request for invocation of MPS. Radio interface priority may be provided only after MPS is established for the MPS voice, video or data session. An initial request for invocation of MPS may be an RRC request, such as an RRC connection setup request, an RRC connection establishment request, an RRC resume request, and/or the like. Because the UE (that does not have an MPS subscription) is not configured with access identity 1 to establish RRC connection with mps-priorityAccess cause, a network may not recognize that the session is for MPS and the AMF may not include a priority header and the request and associated signaling may not receive priority treatment.

In an example, a network may invoke or revoke MPS priority treatment for a PDU session. Invocation of MPS priority treatment from a UE or a PDU session of the UE may be a process to recognize and identify a request for an MPS session. An MPS service provider network recognizes an MPS invocation based on the presence of an MPS-unique identifier entered by the originating Service User in the service request received by the network from the UE, or based on the subscription profile of the originating UE, or as a regional/operator option the subscription profile of the terminating UE.

A 5G system that supports MPS may provide priority treatment to an authorized IoT device with an MPS subscription. In this case, subscription related information stored in the IoT device may be used to allow invocation/revocation of MPS priority treatment through machine interactions that may not directly involve a human MPS service user.

A 5G system may authenticate and authorize an MPS for data transport service (DTS) session request, an MPS session request, or a PDU session that is employed by an MPS or MPS for DTS session from a UE with an MPS subscription (MPS subscribed UE). The 5G system may authenticate and authorize a service user request for an MPS for DTS session from a UE that does not have an MPS subscription (e.g., a public UE, or non-MPS subscribed UE). In an example, the method for authenticating and authorizing the service user using a UE that does not have an MPS subscription may be predetermined. As part of the authentication and authorization method, the service user may provide MPS credentials (e.g., a PIN or security token) specifically assigned for the purpose of obtaining MPS from a UE that does not have an MPS subscription. The 5G system may support means for a visited PLMN, including a visited PLMN outside of the home country of the home PLMN of the 5G system, to verify with the home PLMN that a UE is authorized for MPS and to authorize an MPS for DTS session. The method for authenticating and authorizing a UE for MPS when roaming may be based on operator policy and roaming agreements between the visited PLMN and home PLMN for MPS. The 5G system may support means to authenticate and authorize an MPS for DTS session request from an IoT device with an MPS subscription. The 5G system may support means to authenticate and authorize an enterprise network supporting MPS requesting activation of MPS for DTS for the following cases a specific MPS subscribed UE or IoT device, and a group of MPS subscribed UEs or IoT devices.

A service user may suffer from loss of network connectivity due to UE failure. This may be a result of UE battery exhaustion or physical damage to the UE with an MPS subscription. The service user may use a UE that does not have a subscription for MPS. An attempt may be made to initiate a data communication session (e.g., to download data and/or images using an available browser of the UE). The attempt may comprise a session establishment, PDU session establishment request, and/or the like. Recognizing that normal data service is degraded, the MPS service user may invoke MPS for DTS to obtain priority for the data communication session. Invocation of MPS or MPS for DTS via a UE that does not have a subscription for MPS may be performed using a browser (e.g., by navigating to a predetermined site in a web browser), using an application that is installed and running on the UE, and/or the like. The MPS service provider may authenticate and authorize the service user's use of MPS. As part of the authentication and authorization process, the service user may provide MPS credentials (e.g., a PIN or security token) specifically assigned for the purpose of obtaining MPS from a UE that does not have a subscription for MPS. Once the MPS session is established, priority treatment may be provided for QoS flows, PDU session that is used for the MPS session, media flows or a subset of the media flows associated with the MPS session (e.g., when the MPS session is a video or voice conferencing session). The MPS service user may be able to support different communication applications (e.g., data, streaming video, email, messages) over an MPS for DTS session. When the need for priority communications ends, the service user may explicitly revoke MPS or release MPS. MPS may be automatically revoked upon UE detachment/deregistration, e.g., power down.

In an example, an MPS session may be a session for which priority treatment is applied for allocating and maintaining radio and network resources. In an example, an MPS session may be a session from a UE to an AF or application server (AS) within the network, or with IMS. The MPS session may employ a PDU session within a 5G network or core network to perform transmission of packets for the MPS session. An MPS-subscribed UE may be a UE having MPS subscription. Priority treatment (or MPS priority treatment) may comprise mechanisms and features that increase the success rate for MPS session invocation, establishment and maintenance until release. MPS priority treatment may allow the resources, signaling and data transmission associated with a PDU session to receive high priority e.g., when the network is in overload congestion state.

When a UE with MPS subscription is used, the UE may be a device (e.g., IoT device) having a Universal Subscriber Identity Module (USIM) that is preconfigured with MPS settings. The MPS settings may comprise pre-configuration of the UE to access the network using a specific access identity (e.g., access identity 1). The MPS settings may allow the UE to perform RRC procedures, such as an RRC connection establishment, RRC connection setup request, RRC resume request, and/or the like with an RRC establishment cause of mps-priorityAccess. When a UE is configured with access identity 1 or when an RRC establishment cause of mps-priorityAccess is used during an initial access request (e.g., an RRC request), the network (e.g., RAN or base station) may treat the access request with high priority. The network may admit or accept an RRC request from a UE with an RRC establishment cause mps-priorityAccess when the network is overloaded or congested. When the network is overloaded or congested, the AMF may send an overload start message to a RAN node. The RAN node may determine to reject access requests or RRC requests from UEs until the RAN node receives an overload stop message indicating the overload or congestion is alleviated. When an overload start message is received by the RAN node, the RAN node may reject RRC requests except those associated with emergency services, MPS (e.g., RRC establishment cause mps-priorityAccess), and/or the like. When the UE performs a registration procedure, the RAN node may notify the AMF that the UE has used RRC establishment cause mps-priorityAccess. The AMF based on the RRC establishment cause may determine to include a priority header in subsequent signaling messages associated with the UE. When a UE that does not have a subscription for MPS is used by an MPS service user, the UE is not configured with access identity 1 and may not perform an RRC procedure with a cause related to MPS (e.g., mps-priorityAccess). The AMF during a registration procedure, service request procedure, or PDU session establishment procedure may not recognize that a request of the UE is subject to MPS priority treatment.

In an example, in order for a UE to receive MPS priority treatment by the network, the UE should have received a registration accept message from the network (e.g., AMF, RAN, and/or the like) that comprises an MPS support indication MPSI. When the MPSI is present in the registration accept message and the UE is configured with parameters (configuration parameters, and/or the like) to send PDU session requests to the network, the UE may receive MPS priority treatment. The UE may be configured with one or more PLMNs, or non-public network NPNs that support MPS. The UE may be configured with a DNN that supports MPS. The UE may configured with S-NSSAIs that support MPS.

In an example, the priority header may be 3gpp-Sbi-Message-Priority (e.g., a field, or element of HTTP header). In an example, the priority header may be included or contained within an HTTP/2 message priority value from 0 to 31. The format of the priority header may be 3gpp-Sbi-Message-Priority="3gpp-Sbi-Message-Priority" ":" (DIGIT/% x31-32 DIGIT/"3" % x30-31). In an example, a message with 3gpp-Sbi-Message-Priority "0" may have the highest priority. An example indication may have a format such as 3gpp-Sbi-Message-Priority: 10.

When an MPS subscribed UE is used to access MPS services, the UE is preconfigured with access identity 1 and may perform RRC request with establishment cause mps-priorityAccess. The UE may also be preconfigured to access certain PLMN/NPN or DNN, S-NSSAI to access the service. When the UE is an MPS subscribed UE and is configured to perform access request using access identity 1 and/or RRC establishment cause mps-priorityAccess, during a registration procedure, the network may select an AMF or other core network elements that support MPS. The network may assign a network slice (or S-NSSAI) that supports MPS. The UE may be configured to access the DNN that supports MPS. The UE may be configured with a PLMN (e.g., PLMN ID), an NPN (e.g., NPN ID, network ID, and/or the like) that supports MPS.

When an MPS user uses a UE that does not have MPS subscription to access MPS service, the UE may not be configured with proper parameters to perform a session request (PDU session request) or registration procedure with a PLMN, DNN, and/or S-NSSAI that support MPS or MPS for DTS. When a registration request procedure is performed and the registration accept message does not comprise the MPS indication MPSI, the UE may not be able to request MPS priority treatment in any subsequent requests. The UE's request for MPS service may be rejected and may not be able to establish any PDU session or receive MPS priority treatment and subsequent requests for MPS may be rejected based on lack of MPS support. In an example, the UE that does not have MPS subscription, upon initial registration, may receive a registration accept message that does not comprise MPS support indication (MPSI). The UE may be required to receive configuration update in order to receive information on the PLMN or non-public network NPN(s) that support MPS.

In an example, the UE that does not have MPS subscription is not configured with MPS related parameters. Because the UE is not configured with MPS related parameters, the UE may not be able to access the network and receive MPS priority treatment (e.g., when an MPS service user uses the UE that does not have MPS subscription, during a registration procedure, the UE may receive a registration accept message that does not comprise MPSI). When the registration accept message does not comprise MPSI, the network may not support MPS and UE requests related to MPS such as PDU session establishment request, service request, and/or the like may not be successful and the network may send a reject message with a cause.

Embodiments of the present disclosure provide UE configuration update procedure to configure the UE to request MPS priority treatment. Embodiments of the present disclosure provide signaling for a registration request procedure, service request procedure, PDU session establishment request procedure, and/or the like that may be used to solve the issue of UE (e.g., UE that does not have MPS subscription) configuration. The signaling may comprise indicating to the network that that request is for an MPS priority service (or MPS for DTS) and the UE is being used by an MPS service user that may request sessions that require MPS priority treatment or MPS for DTS. In response to the indication from the UE, the network may configure the UE for MPS or MPS for DTS. In an example, implementation of signaling for registration request procedure may be to initiate a UE configuration update (UCU) to configure the UE with a UE route selection policy URSP wherein the URSP comprises a connection type of MPS associated with the DNN and/or the S-NSSAI that supports MPS. In an embodiment, the UE may receive a configuration via SIB message to configure the UE to access a network/NPN/PLMN that supports MPS. Embodiments of the signaling procedure may enable the UE that does not have MPS subscription to access a network and receive MPS priority treatment or request MPS for DTS.

Figure 15:
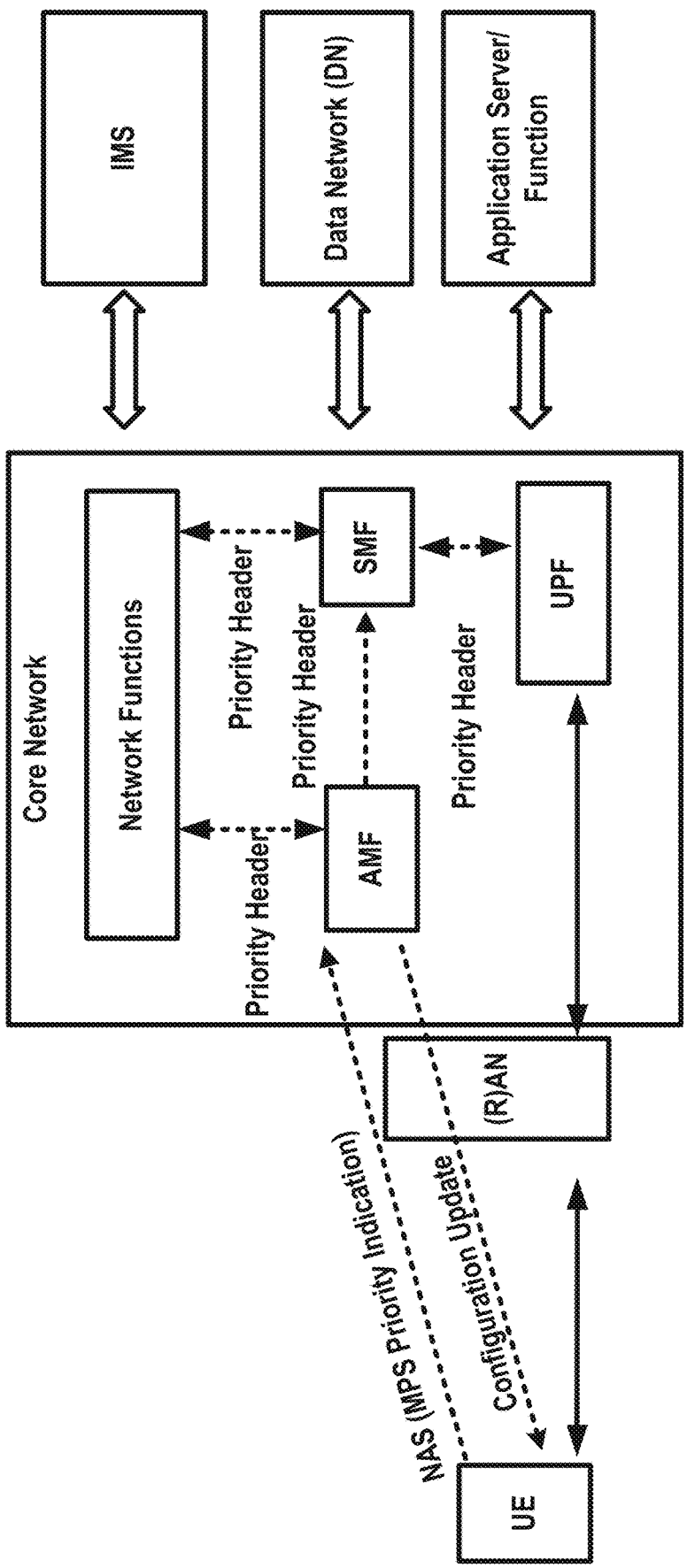
FIG. 15 illustrates an example embodiment of a present disclosure.

FIG. 15 illustrates a diagram comprising a wireless device, a RAN node, a core network, an IMS, an application function, and a data network in accordance with embodiments of the present disclosure. As depicted in FIG. 15, the wireless device may transmit a NAS message to the core network that comprises an MPS indication. In an example, the NAS message may comprise an MPS-unique identifier. The wireless device may be a wireless device having a USIM that is preconfigured with MPS settings. The wireless device may be a wireless device that is not preconfigured with MPS settings, or wireless device that does not have a subscription to MPS. The MPS settings may comprise pre configuration of the wireless device to access the network using a specific access identity (e.g., access identity 1). The MPS settings may allow the wireless device to perform RRC procedures such as RRC connection establishment, RRC resume request, and/or the like with RRC establishment cause of mps-priorityAccess. The NAS message may be message during a PDU session establishment procedure, a service request procedure, or a registration procedure. The NAS message may be a MM-NAS message sent from the wireless device to an AMF. The NAS message may be a SM-NAS message sent from the wireless device to the SMF. In an example, when the network receives the MPS indication, MPS unique identifier, MPS for DTS indication, and/or the like from the UE, the network may determine that MPS or MPS for DTS may not be supported by the network, requested DNN, requested S-NSSAI, and/or the like. The network may perform a UE configuration update UCU procedure to send configuration parameters to the UE for MPS or MPS for DTS access requests.

In the example of FIG. 15, the wireless device may determine to establish a connection with an application server, an application function, a data network, or an entity within the IMS. The connection may employ a PDU session via the core network. The PDU session that is used for an MPS connection to an application may require MPS priority treatment. The MPS priority treatment may comprise prioritization of signaling, and user plane flows and sessions associated with the MPS connection. The MPS priority treatment may comprise exempting requests associated with the MPS connection from overload and congestion control that may be performed by the SMF or the AMF. The MPS priority treatment may comprise assigning an ARP that meets the priority requirement of an MPS service or MPS application. In an example, when one or more parameters of request are not supported by MPS or the request may not be accepted, the network may determine to configure the UE. The configuration may be UCU procedure that may comprise sending or updating a URSP to the UE. The UE may employ the URSP to request MPS priority treatment from the network e.g., send a PDU session establishment request for PDU session wherein the PDU session may receive MPS priority treatment.

Figure 16:
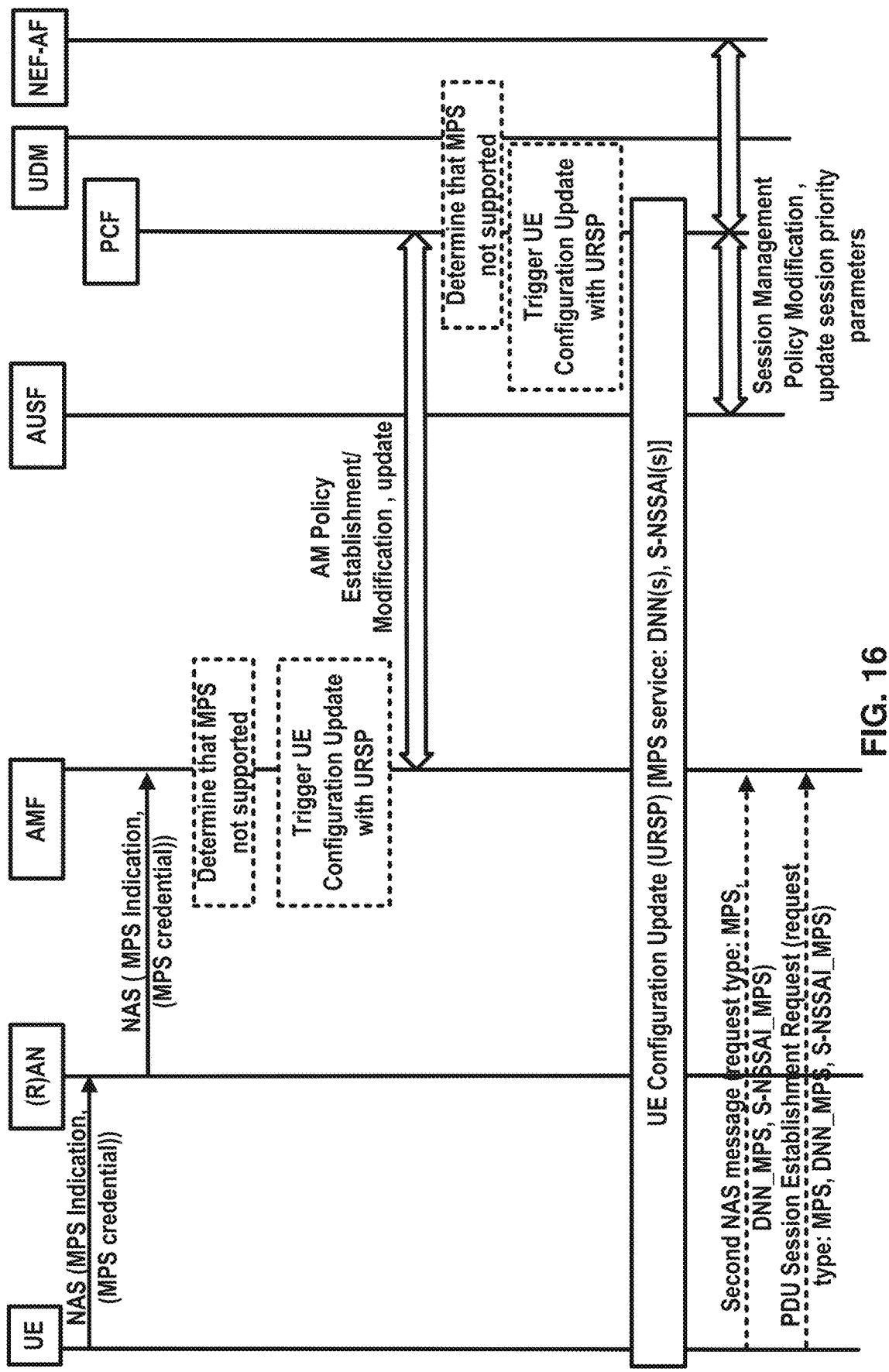
FIG. 16 illustrates an example embodiment of a present disclosure.

FIG. 16 illustrates a call flow of a procedure for an access request procedure (e.g., a registration request procedure, service request procedure, PDU session establishment request, and/or the like) performed for a wireless device in accordance with embodiments of the present disclosure. A wireless device may request MPS priority treatment via NAS signaling. The NAS signaling may be a NAS request message as part of a PDU session establishment procedure. In an example, the NAS message may be a PDU session establishment request message. In an example, the NAS message may be a service request message. In an example, the NAS message may be a registration request message. When the wireless device sends the NAS message to the network, if MM-NAS is used, the AMF may receive the NAS message. The NAS message may comprise an MPS indication. In an example, the NAS message may comprise an MPS-unique identifier. In an example, the NAS message may comprise a request type. The request type may be MPS/MPS priority (or MPS for DTS), emergency, initial request, and/or the like. When the AMF receives the NAS message that comprises the MPS indication, MPS-unique identifier or the request type indicates MPS priority, the AMF may determine that the network does not support MPS or MPS for DTS. The AMF may send a message to a PCF and the PCF may determine that MPS is not supported based on network operator support, UE subscription, one or more elements of the NAS message (e.g., DNN, S-NSSAI, and/or the like). The PCF may trigger a UE configuration update (UCU) procedure to perform delivery, or update of a UE route selection policy URSP for the UE. In an example, the AMF in response to receiving the MPS indication may determine that network does not support MPS or MPS for DTS. The AMF may trigger the UCU procedure and transmit or update the URSP for the UE. The AMF may receive the URSP configuration from a PCF, UDM/UDR, NWDAF, and/or the like.

As depicted in FIG. 16, when the UE receives the URSP or configuration parameters for MPS (or MPS for DTS), the UE may send a second NAS message. The UE may employ the configuration parameters or the URSP to determine one or more elements of the second NAS message. The second NAS message may be a PDU session establishment request message, service request message, registration request message, and/or the like.

Figure 17:
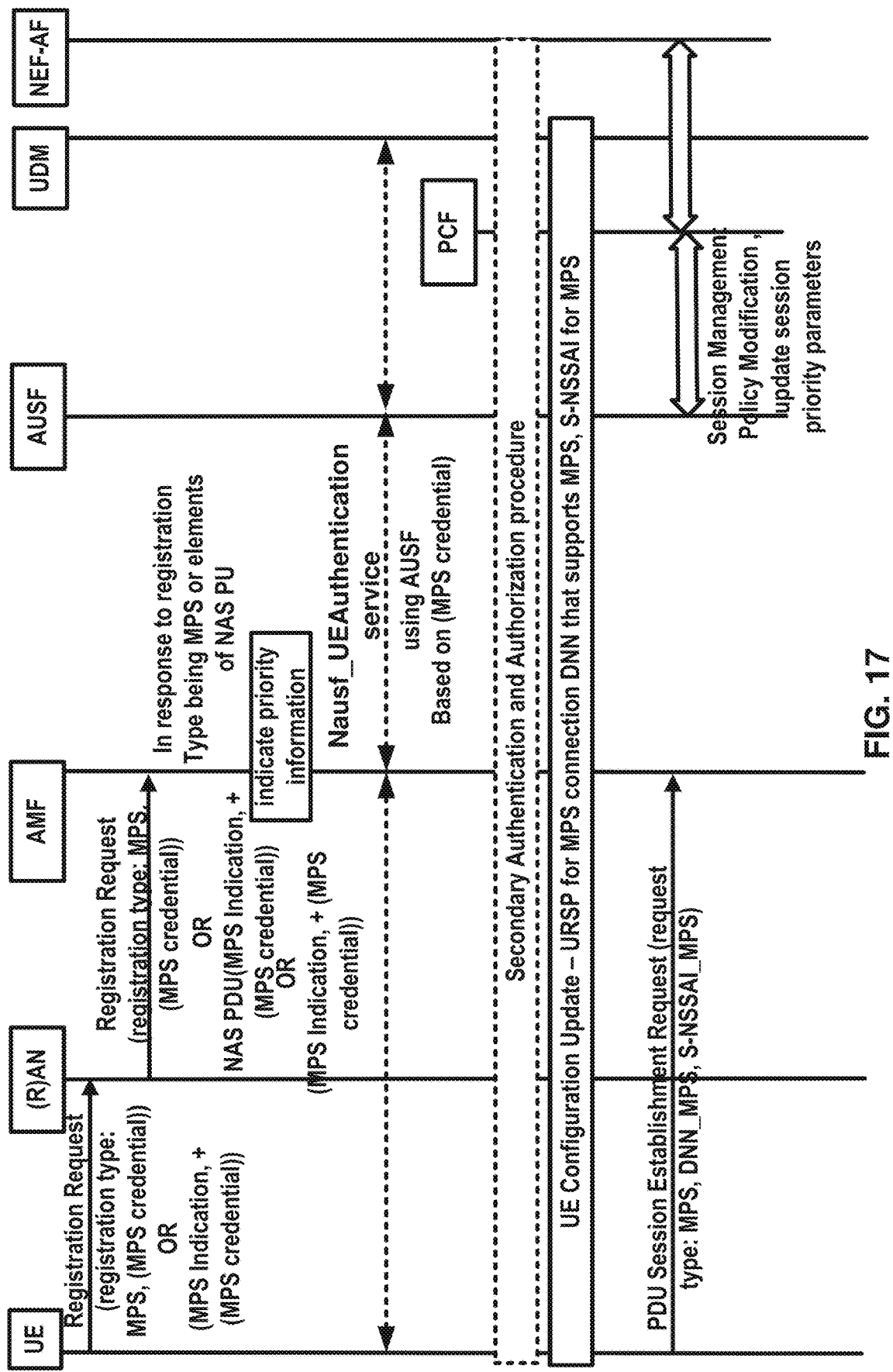
FIG. 17 illustrates an example embodiment of a present disclosure.

FIG. 17 illustrates a call flow of a procedure for an example registration procedure for MPS in accordance with embodiments of the present disclosure. The UE may send to a (R)AN node an AN message comprising an MPS indication, an MPS-unique identifier an MPS code, and/or the like. The AN message may comprise MPS credentials. The AN message may comprise AN parameters, Registration Request (Registration type=MPS or MPS for DTS, SUCI or 5G-GUTI or PEI, [last visited TAI (if available)], Security parameters, [Requested NSSAI], [Mapping Of Requested NSSAI], [Default Configured NSSAI Indication], [UE Radio Capability Update], [UE MM Core Network Capability], [PDU Session status], [List Of PDU Sessions To Be Activated], [Follow-on request], [MICO mode preference], [Requested Active Time], [Requested DRX parameters], [extended idle mode DRX parameters], [LADN DNN(s) or Indicator Of Requesting LADN Information], [NAS message container], [Support for restriction of use of Enhanced Coverage], [Preferred Network Behaviour], [UE paging probability information], [UE Policy Container (the list of PSIs, indication of UE support for ANDSP and the operating system identifier)] and [UE Radio Capability ID], PEI).

In an example, if a 5G-S-TMSI or GUAMI is not included or the 5G-S-TMSI or GUAMI does not indicate a valid AMF the (R)AN, based on (R)AT and Requested NSSAI, if available, the RAN node may select an AMF. If UE is in CM-CONNECTED state, the (R)AN may forward the registration request message to the AMF based on the N2 connection of the UE. If the (R)AN cannot select an appropriate AMF, it may forward the registration request to an AMF which has been configured, in (R)AN, to perform AMF selection.

In an example, the (R)AN node may send to an AMF an N2 message (e.g., comprising the MPS indication, MPS-unique identifier an MPS code, and/or the like. The N2 message may comprise N2 parameters, Registration Request and [LTE-M Indication]. When NG-RAN is used, the N2 parameters may include the Selected PLMN ID (or PLMN ID and NID, Location Information and Cell Identity related to the cell in which the UE is camping, UE Context Request which indicates that a UE context including security information needs to be setup at the NG-RAN. When NG-RAN is used, the N2 parameters may comprise an Establishment cause and IAB-Indication if the indication is received in AN parameters. The establishment cause may be MPS, mps-priorityAccess, and/or the like.

In an example, if the Registration type indicated by the UE is MPS, the AMF may determine whether or not the network supports MPS.

When the establishment cause is associated with priority services (e.g. MPS, MCS), the AMF may include the message priority header to indicate priority information. Other network functions (NFs) may relay the priority information by including the Message Priority header in service-based interfaces.

The registration procedure may proceed as described in FIG. 8 and FIG. 9. In an example, if the registration type indicated by the UE is MPS, the AMF may determine whether or not the network supports MPS. If the network supports MPS, the AMF may send a registration accept message comprising an MPSI (MPS support indication) to the UE. If the network does not support MPS, the AMF may perform a UCU procedure. The AMF may send a policy association message to a PCF to trigger the UCU. The AMF may perform the UCU if requires configuration parameters for MPS are locally available.

Figure 18:
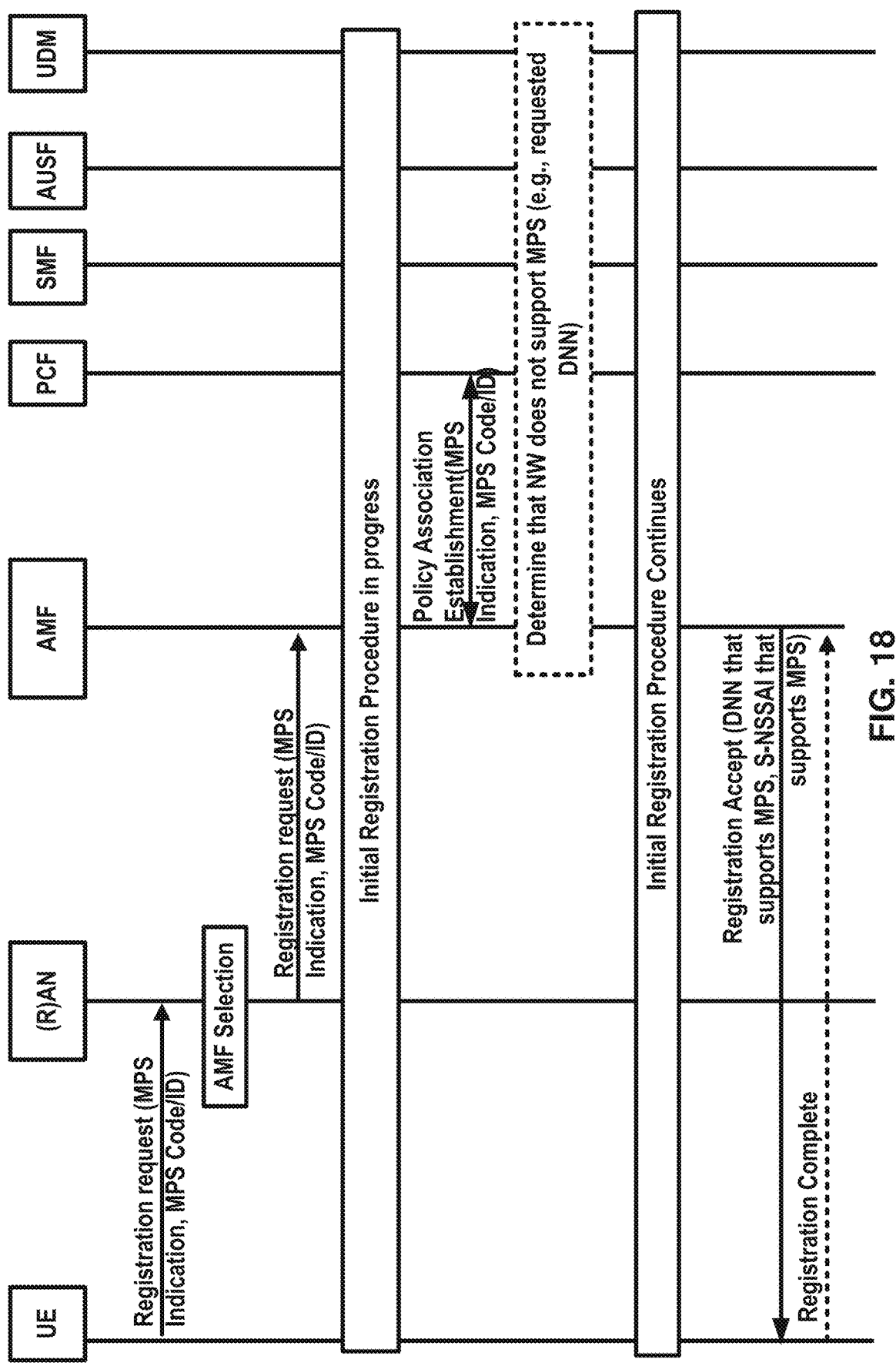
FIG. 18 illustrates an example embodiment of a present disclosure.

FIG. 18 illustrates a call flow of a procedure for an example registration procedure in accordance with embodiments of the present disclosure. As depicted in FIG. 17 and FIG. 18, when the AMF receives the MPS indication, or the registration type indicates MPS, the AMF may determine that network support may be for one or more DNNs associated with MPS. The AMF may determine that MPS network support may be provided for one or more S-NSSAIs. Upon completion of the registration procedure, the AMF may send a registration accept message. The registration accept massage may comprise the one or more DNNs, the one or more S-NSSAIs and/or the like. The UE may employ the elements of registration accept message to perform a PDU session establishment request for MPS (e.g., establish a PDU session that receives MPS priority treatment).

In an example embodiment as depicted in FIG. 17, the UE configuration update procedure may be triggered when a secondary authentication and authorization procedure with MPS credentials of the MPS service user is successful.

Figure 19:
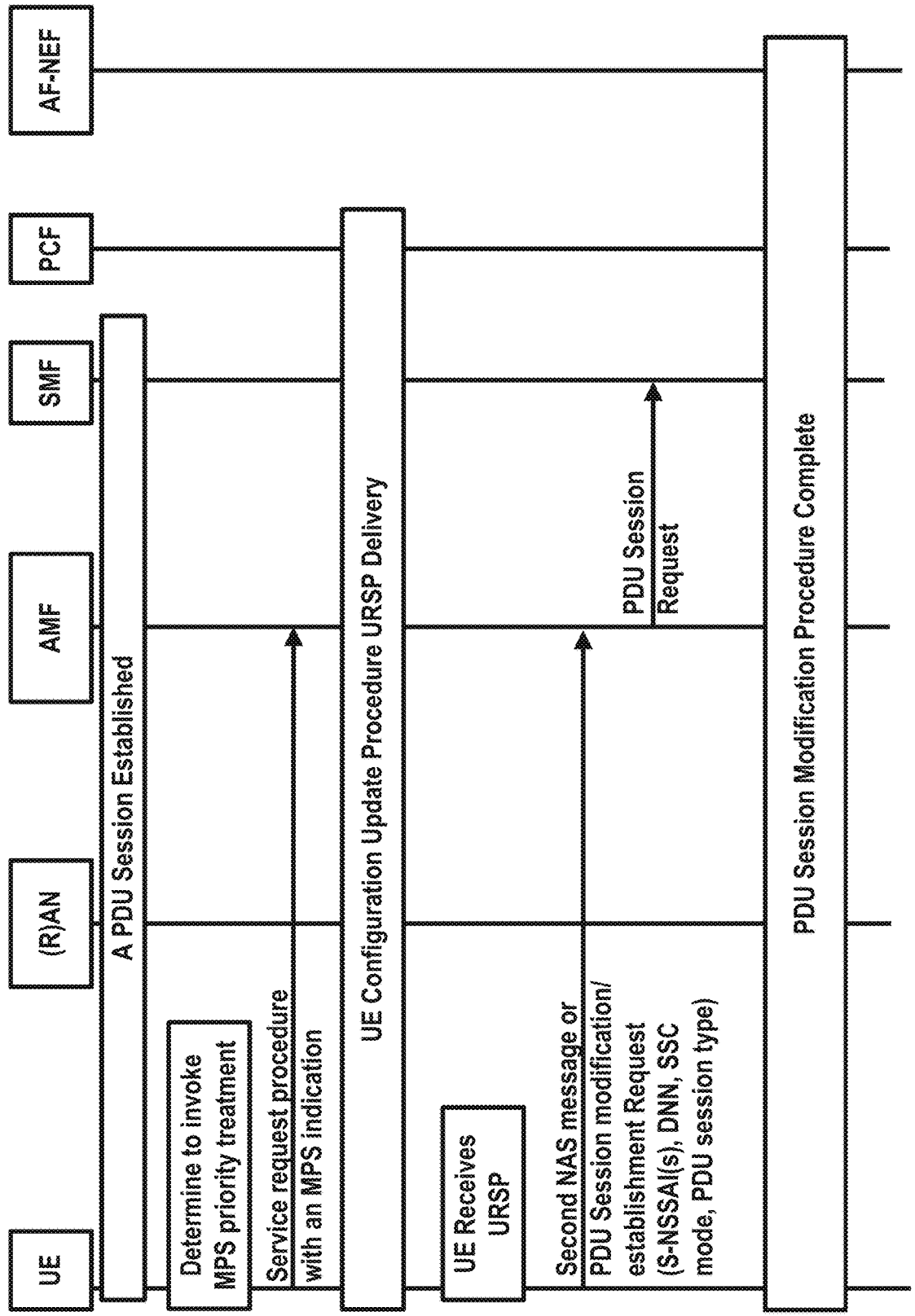
FIG. 19 illustrates an example embodiment of a present disclosure.

FIG. 19 illustrates a call flow of a procedure for an example configuration update during a service request procedure in accordance with embodiments of the present disclosure. In an example, a UE in CM IDLE state may initiate a service request procedure in order to send uplink signalling messages, user data, to request MPS priority treatment, to request emergency services fallback, or as a response to a network paging request. After receiving the service request message, the AMF may perform authentication. After the establishment of the signalling connection to an AMF, the UE or network may send signalling messages, e.g., PDU session establishment from the UE to a SMF, via the AMF. The service request procedure may be employed by a UE in CM-CONNECTED to request invocation or activation of MPS priority treatment for one or more PDU sessions of the UE. The service request procedure may be employed by a UE in CM-CONNECTED to request activation of a user plane connection for PDU sessions and to respond to a NAS notification message from the AMF. When a user plane connection for a PDU session is activated, the AS layer in the UE indicates it to the NAS layer. For any service request, the AMF may respond with a service accept message to synchronize PDU Session status between UE and network, if necessary. The AMF may respond with a service reject message to UE, if the service request cannot be accepted by network. The service reject message may include an indication or cause code requesting the UE to perform registration procedure. The cause code may indicate that MPS or MPS for DTS is not supported by the network. When the network sends a service reject message, the service reject message may comprise one or more configuration parameters for the UE to perform a registration request procedure. The one or more configuration parameters may be a DNN that supports MPS, a S-NSSAI that supports MPS, a PLMN ID that supports MPS, a NPN ID that supports MPS, and/or the like.

In an example, the service request procedure is depicted and described in FIG. 10 and FIG. 11. In an example embodiment as depicted in FIG. 19, during the service request procedure, the UE may send to a (R)AN node an AN message (e.g., comprising AN parameters, Service Request (List Of PDU Sessions To Be Activated, List Of Allowed PDU Sessions, security parameters, PDU Session status, 5G-S-TMSI, [NAS message container], Exempt Indication)). In an example, the AN message may be a service request message. In an example, the AN message may comprise an MPS indication. In an example, the AN message may comprise an MPS for DTS indication. In an example, the AN message may comprise an MPS-unique identifier. In an example, the AN message may comprise an MPS code. The NAS message container may be included if the UE is sending a service request message as an Initial NAS message. The list of PDU sessions to be activated may be provided by the UE when the UE determines to re-activate the PDU session(s). The list of allowed PDU Sessions may be provided by the UE when the service request is a response of a paging or a NAS notification for a PDU session associated with non-3GPP access, and identifies the PDU sessions that can be transferred to 3GPP access.

In an example, the (R)AN node may send to the AMF an N2 Message (comprising N2 parameters, service request, and/or the like). When NG-RAN is used, the N2 parameters may comprise a 5G-S-TMSI, selected PLMN ID (or PLMN ID and NID), location information and Establishment cause, UE context request, and/or the like. When the establishment cause is associated with priority services (e.g. MPS, MCS), the AMF may include a message priority header to indicate priority information. Other NFs may relay the priority information by including the message priority header in service-based interfaces.

In an example, when the N2 message comprises the MPS indication, MPS for DTS indication, MPS-unique identifier, MPS code, and/or the like. In an example, the AMF may receive a NAS message that may comprise the MPS indication, MPS for DTS indication, MPS-unique identifier, MPS code, and/or the like. When the AMF receives the N2 message or the NAS message that comprises the MPS indication, MPS-unique identifier or the request type indicates MPS priority, the AMF may determine that the network does not support MPS or MPS for DTS. The AMF may send a message to a PCF and the PCF may determine that MPS is not supported based on network operator support, UE subscription, one or more elements of the NAS message (e.g., DNN, S-NSSAI, and/or the like). The PCF may trigger a UE configuration update (UCU) procedure to perform delivery, or update of a UE route selection policy URSP for the UE. In an example, the AMF in response to receiving the MPS indication may determine that network does not support MPS or MPS for DTS. The AMF may trigger the UCU procedure and transmit or update the URSP for the UE. The AMF may receive the URSP configuration from a PCF, UDM/UDR, NWDAF, and/or the like.

As depicted in FIG. 19, when the UE receives the URSP or configuration parameters for MPS (or MPS for DTS), the UE may send a second NAS message. The UE may employ the configuration parameters or the URSP to determine one or more elements of the second NAS message. The second NAS message may be a PDU session establishment/modification request message, service request message, registration request message, and/or the like.

Figure 20:
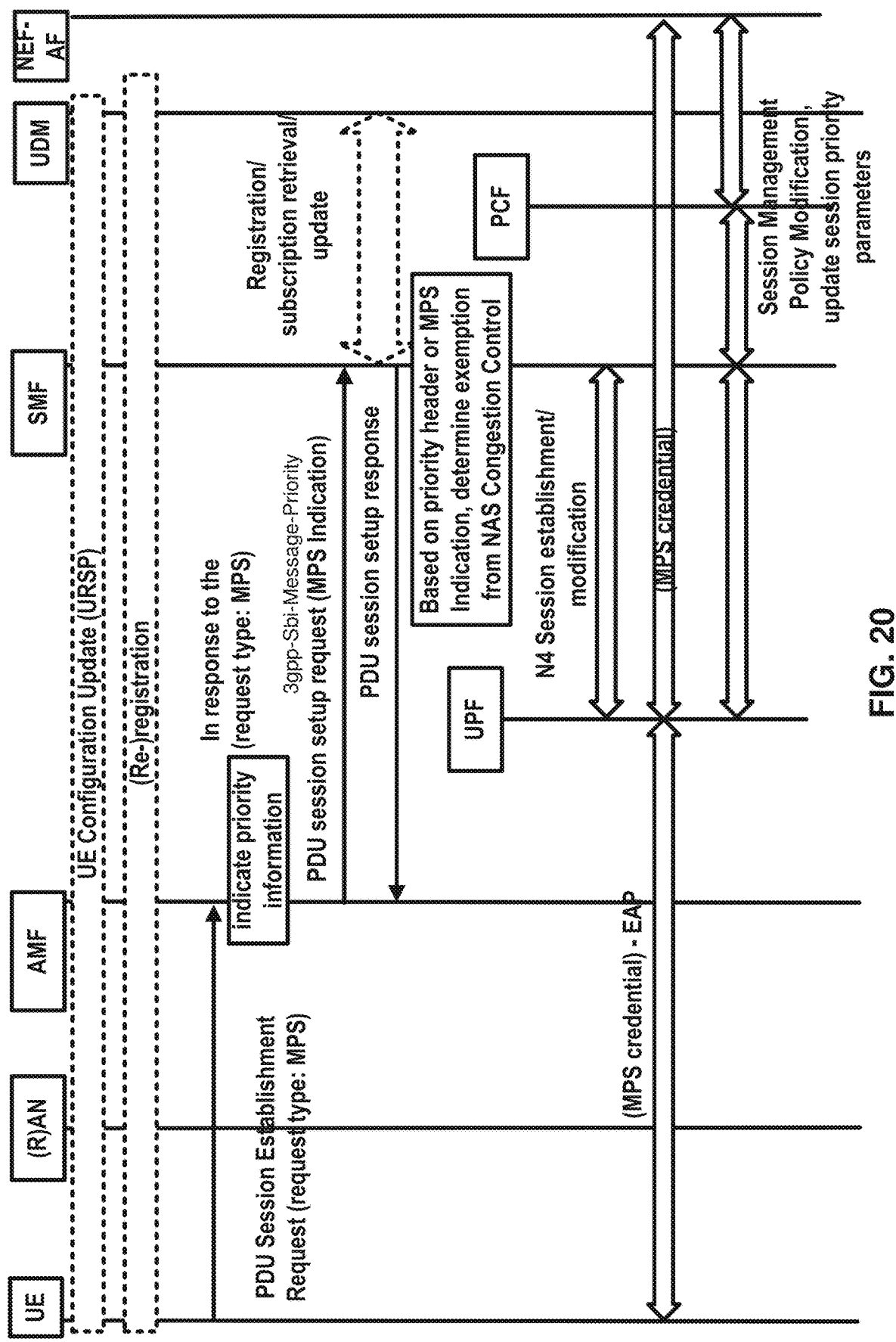
FIG. 20 illustrates an example embodiment of a present disclosure.

FIG. 20 illustrates a call flow of a procedure for a PDU session establishment procedure to request MPS priority treatment for the PDU session. The procedure may comprise activation or invocation of MPS priority procedure wherein the authentication and authorization is performed via a user plane connection for a wireless device (UE) or an MPS user in accordance with embodiments of the present disclosure. In an example, the UE may perform a PDU session establishment procedure to establish a PDU session that can be employed for a session of the UE with an application or service that requires MPS priority treatment. The session or connection that employs the PDU session may be a session between the UE and an IMS application server or an entity with the IMS. The session or connection that employs the PDU session may be session that employs session initiation protocol (SIP). An example, the UE may send a NAS message to the AMF.

An example as depicted in FIG. 20, the UE may send a registration request with MPS indication. The network in response to receiving the MPS indication, and/or the like may determine that the network does not support the MPS and may determine to perform a UE configuration update procedure (UCU). Upon performing the UCU procedure, the UE may receive UE route selection policy (URSP) that may comprise parameters or configuration parameters associated with MPS. The configuration parameters may comprise one or more DNN(s) and/or one or more S-NSSAI(s) associated with MPS. The UE may send a NAS message comprising a S-NSSAI (e.g., the one or more S-NSSAI(s) associated with MPS), a DNN (e.g., the one or more DNN(s) associated with MPS), UE Requested DNN, PDU Session ID, Request type=MPS or MPS for DTS, Old PDU Session ID, N1 SM container (PDU Session Establishment Request, [Port Management Information Container]), and/or the like. The UE may initiate the UE Requested PDU Session Establishment procedure by the transmission of a NAS message containing a PDU Session Establishment Request within the N1 SM container. The PDU Session Establishment Request may comprise a PDU session ID, Requested PDU Session Type, a Requested SSC mode, 5GSM Capability, PCO, SM PDU DN Request Container, [Number Of Packet Filters], [Header Compression Configuration], UE Integrity Protection Maximum Data Rate, and [Always-on PDU Session Requested]. In an example, the NAS message may comprise MPS indication, MPS for DTS indication, and/or the like. In an example, the NAS message may comprise an MPS-unique identifier. In an example, the N1 SM container may comprise MPS indication, MPS for DTS indication, MPS-unique identifier, and/or the like. In an example, the UE may send to a base station or a RAN node a message comprising the MPS indication, or the MPS for DTS indication. When a UE that does not have a subscription to MPS is used by the MPS service user, the RRC establishment cause for MPS may not be used. The MPS indication or the MPS for DTS indication may be included in the message from the UE to the base station during the registration procedure or the PDU session establishment procedure. The base station may employ the MPS indication or the MPS for DTS indication to prioritize the UE or the PDU sessions of the UE when overload conditions happen, and exempt the UE from overload and congestion control barring.

In an example, the NAS message sent by the UE may encapsulated by the AN in a N2 message towards the AMF that may comprise the MPS indication (or the MPS for DTS indication), User location information, Access Type Information, and/or the like. When the MPS indication received as part of AN parameters during the PDU session establishment procedure (or during the Registration procedure or Service Request procedure), the AMF may determine that request is associated with priority services (e.g., MPS, MCS). The AMF may include a message priority header to indicate priority information. The SMF may use the message priority header to determine if the UE request is subject to exemption from NAS level congestion control. Other NFs may relay the priority information by including the Message Priority header in service-based interfaces.

In an example, the PDU Session Establishment Request message may comprise SM PDU DN Request Container containing information for the PDU Session authorization by the external DN. In an example, the SM PDU DN request container may comprise MPS credentials of the MPS service user.

The UE capability to support Reliable Data Service is included in the PCO in the PDU Session Establishment Request message. The PCO may comprise the MPS indication.

In an example, in response to receiving the NAs message from the UE or the N2 message from the RAN node, the AMF may determine that the message corresponds to a request for a PDU session that requires MPS priority treatment. The AMF may determine that the request is for a new PDU Session based on that Request Type indicates "initial request" and that the request type further indicating MPS or MPS for DTS request type. If the NAS message does not contain an S-NSSAI, the AMF determines a default S-NSSAI of the HPLMN for the requested PDU Session. The AMF may determine a S-NSSAI that is dedicated for or supports MPS priority treatment. The S-NSSAI may be selected according to the UE subscription, if it contains only one default S-NSSAI, or based on operator policy and, in the case of LBO, an S-NSSAI of the Serving PLMN which matches the S-NSSAI of the HPLMN. When the NAS Message contains an S-NSSAI of the Serving PLMN but it does not contain a DNN, the AMF may determine the DNN that supports MPS or MPS for DTS. The AMF may determine for the requested PDU Session by selecting the default DNN for this S-NSSAI if the default DNN is present in the UE's Subscription Information (or for the corresponding S-NSSAI of the HPLMN, in the case of LBO); otherwise the serving AMF may select a locally configured DNN for MPS support or for this S-NSSAI of the Serving PLMN. If the AMF cannot select an SMF (e.g. the UE requested DNN is not supported by the network, or the UE requested DNN is not in the Subscribed DNN List for the S-NSSAI (or its mapped value for the HPLMN in the case of LBO) and wildcard DNN is not included in the Subscribed DNN list), the AMF may, based on operator policies received from PCF, either reject the NAS Message containing PDU Session Establishment Request from the UE with an appropriate cause or request PCF to replace the UE requested DNN by a selected DNN. If the DNN requested by the UE is present in the UE subscription information but indicated for replacement in the operator policies received from PCF, the AMF shall request the PCF to perform a DNN replacement to a selected DNN. If the DNN requested by the UE is present in the UE subscription information but not supported by the network and not indicated for replacement in the operator policies received from PCF, the AMF shall reject the NAS Message containing PDU Session Establishment Request from the UE with an appropriate cause value. If the DNN requested by the UE is present in the UE subscription information but the DNN does not support MPS and not indicated for replacement in the operator policies received from PCF, the AMF may reject the NAS Message containing PDU Session Establishment Request from the UE with an appropriate cause value. The cause value may indicate that the rejection is due to MPS support e.g., MPS not supported for the DNN, or MPS not supported in the PLMN.

The AMF may send to the SMF an N11 message, or a PDU session setup message: either Nsmf_PDUSession_CreateSMContext Request (comprising MPS indication (or MPS for DTS indication), SUPI, selected DNN, UE requested DNN, S-NSSAI(s), PDU Session ID, AMF ID, Request Type, PCF ID, Priority Access, [Small Data Rate Control Status], N1 SM container (PDU Session Establishment Request), User location information, Access Type, RAT Type, PEI, GPSI, UE presence in LADN service area, Subscription For PDU Session Status Notification, DNN Selection Mode, Trace Requirements, Control Plane CIoT 5GS Optimisation indication, or Control Plane Only indicator) or Nsmf_PDUSession_UpdateSMContext Request (comprising MPS indication (or MPS for DTS indication), SUPI, DNN, S-NSSAI(s), SM Context ID, AMF ID, Request Type, N1 SM container (PDU Session Establishment Request), User location information, Access Type, RAT type, PEI, Serving Network (PLMN ID, or PLMN ID and NID)). If the AMF does not have an association with an SMF for the PDU Session ID provided by the UE (e.g. when Request Type indicates "initial request"), the AMF may invoke the Nsmf_PDUSession_CreateSMContext Request, but if the AMF already has an association with an SMF for the PDU Session ID provided by the UE (e.g. when Request Type indicates "existing PDU Session"), the AMF may invoke the Nsmf_PDUSession_UpdateSMContext Request.

When RRC establishment cause received as part of AN parameters during the Registration procedure or Service Request procedure is associated with priority services (e.g. MPS, MCS), the AMF may include a Message Priority header to indicate priority information. When RRC establishment cause does not indicate MPS or MPS for DTS, the AMF may determine based on the MPS indication or MPS for DTS indication included in the NAS message, N2 message, and/or the like and based on the indication, the AMF may include a message priority header to indicate priority information. The SMF may uses the message priority header to determine if the UE request is subject to exemption from NAS level congestion control. Other NFs relay the priority information by including the Message Priority header in service-based interfaces.

In an example, the SMF may send to the AMF an N11 response message or a PDU session setup response message. The N11 response message may be a Nsmf_PDUSession_CreateSMContext Response (Cause, SM Context ID or N1 SM container (PDU Session Reject (Cause))) or an Nsmf_PDUSession_UpdateSMContext Response. If the SMF received Nsmf_PDUSession_CreateSMContext Request and the SMF is able to process the PDU Session establishment request, the SMF creates an SM context and responds to the AMF by providing an SM Context ID. If the UP Security Policy for the PDU Session is determined to have Integrity Protection set to "Required", the SMF may, based on local configuration, decide whether to accept or reject the PDU Session request based on the UE Integrity Protection Maximum Data Rate. The SMF based on the MPS indication and network support, UE or MPS user subscription, and/or the like may determine to reject the MPS priority treatment request. When the SMF determines to not accept to establish a PDU Session, the SMF may reject the UE request via NAS SM signalling including a relevant SM rejection cause (e.g., MPS not supported, MPS not allowed/supported with the S-NSSAI, MPS not allowed/supported for the DNN, MPS not allowed/supported, and/or the like) by responding to the AMF with Nsmf_PDUSession_CreateSMContext Response. The SMF also indicates to the AMF that the PDU Session ID is to be considered as released, and the PDU Session Establishment procedure is stopped.

The SMF may send an N4 session establishment/modification request to the UPF and may provide Packet detection, enforcement and reporting rules to be installed on the UPF for this PDU Session. The packet detection rules (PDR) may comprise an association of an N4 session or the PDU session with MPS priority indication, MPS indication, MPS for DTS indication and/or the like. The N4 session establishment/modification request message may comprise an MPS indication. The SMF may store a mapping of the N4 session ID and the PDU session ID. The UPF may be configured that with MPS priority treatment option for an N4 session that is subject to MPS priority treatment. For example, during an overload of N4 interface, the N4 signaling such as data notifications associated with the N4 session of MPS service may be prioritized with higher priority. In an example, when control plane data transmission is employed for the UE that is used by the MPS service user, and one or more PDU sessions of the UE employ control plane transmission of use CIoT optimization for control plane (e.g., control plane CIoT 5GS optimization), transmission of data packets via N4 interface may receive MPS priority treatment. In an example, the UE may be a CIoT UE and uses CIoT optimizations such as 5G CIoT control plane optimization, or 5G CIoT user plane optimization.

If the SMF is configured to request IP address allocation from UPF, then the SMF may indicate to the UPF to perform the IP address/prefix allocation, and includes the information required for the UPF to perform the allocation. If the selective user plane deactivation is required for this PDU Session, the SMF may determines the inactivity timer and provides it to the UPF. The inactivity timer for MPS priority may be configured with a different value.

The UPF may acknowledge by sending an N4 Session Establishment/Modification Response to the SMF. Upon completion of the PDU session establishment, the UE and the AF may employ an EAP client and an EAP server to perform AA via user plane. The AF may send a request the UE to provide MPS credentials. The UE may response to the AF with the MPS credentials or security tokens. If the AA fails, the AF may notify the PCF, or SMF (e.g., via NEF) to revoke MPS priority treatment from one or PDU sessions of the UE.

Figure 21:
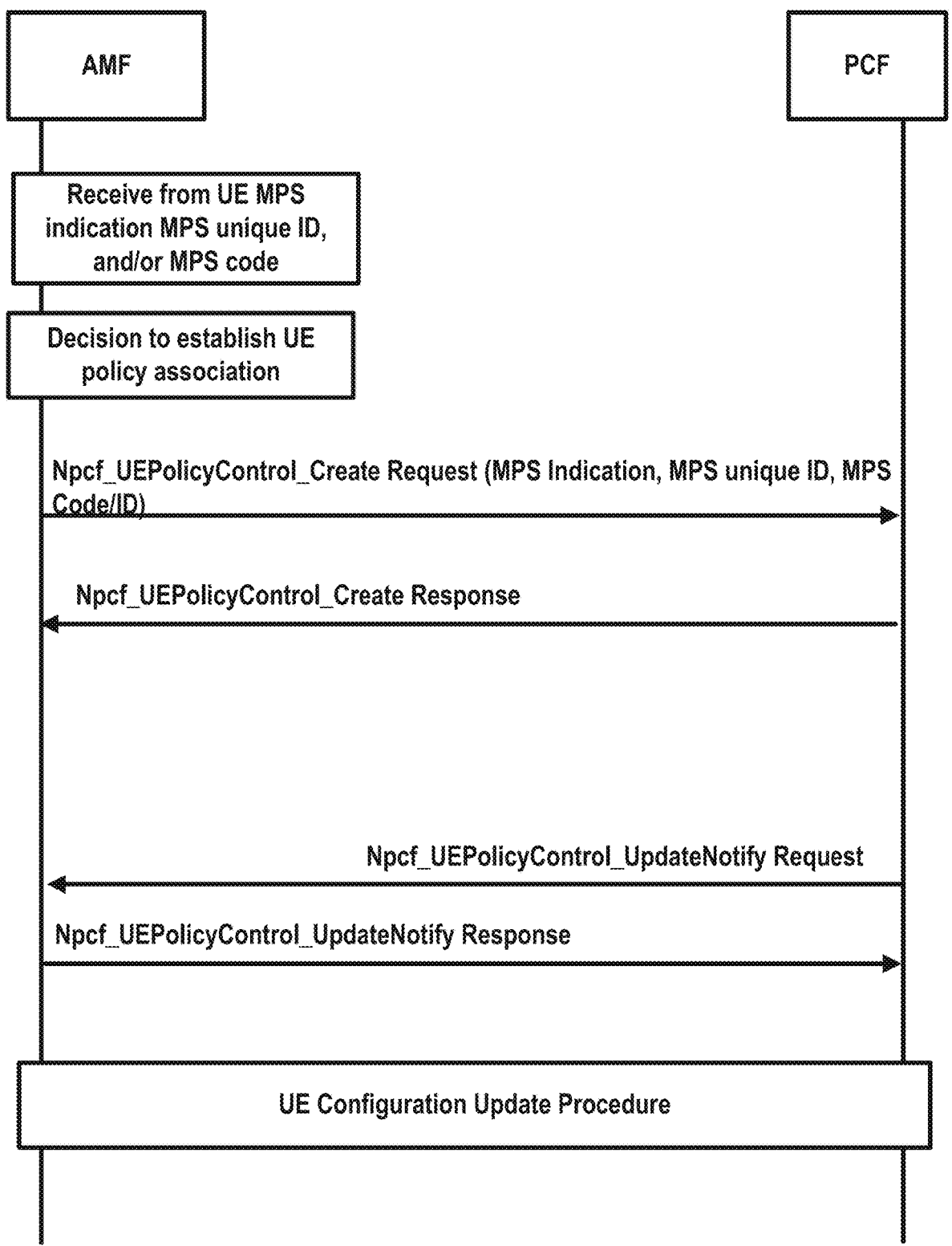
FIG. 21 illustrates an example embodiment of a present disclosure.

FIG. 21 illustrates an example of a UCU procedure triggered by the AMF in accordance with embodiments of the present disclosure. In an example embodiment as depicted in FIG. 21, in the non-roaming case the role of the V-PCF may be performed by the PCF. For the roaming scenarios, the V-PCF may interact with the AMF. The AMF may receive a NAS message from a UE that may comprise an MPS indication, an MPS code, an MPS unique identifier, MPS credentials, and/or the like. Based on the elements of the NAS message and/or local policies, the AMF may determine or decide to establish AM Policy Association with the (V-)PCF. If the AMF has not yet obtained access and mobility policy for the UE or if the access and mobility policy in the AMF are no longer valid, the AMF may request the PCF to apply operator policies for the UE from the PCF. The AMF may send Npcf_AMPolicyControl_Create to the (V-)PCF to establish an AM policy control association with the (V-)PCF. The request may comprise the following information: SUPI, Internal Group subscription notification indication and, if available, service area restrictions, RFSP index, Subscribed UE-AMBR, the Allowed NSSAI, GPSI which are retrieved from the UDM during the update location procedure, and may include Access Type and RAT Type, PEI, ULI, UE time zone, and Serving Network (PLMN ID, or PLMN ID and NID. The (V-)PCF may respond to the Npcf_AMPolicyControl_Create service operation. The (V)-PCF may provide access and mobility related policy information (e.g., Service Area Restrictions). In addition, (V)-PCF may provide policy control request trigger of AM Policy Association to AMF. The AMF may be implicitly subscribed in the (V-)PCF to be notified of changes in the policies. The AMF may deploy the Access and mobility related policy information which includes storing the service area restrictions and policy control request trigger of AM policy association, provisioning service area restrictions to the UE and provisioning the RFSP index, the UE-AMBR and Service Area Restrictions to the NG-RAN.

Figure 22:
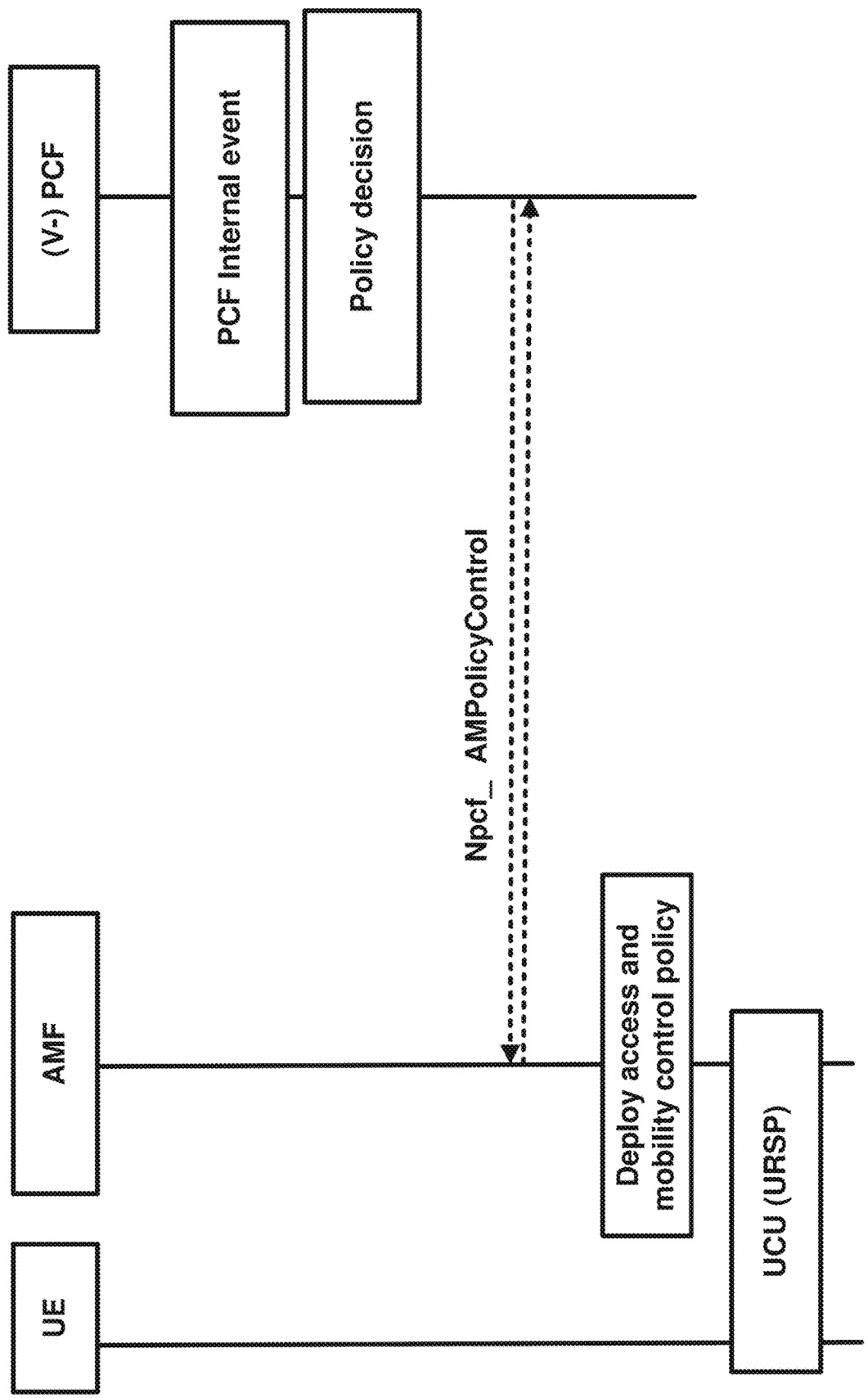
FIG. 22 illustrates an example embodiment of a present disclosure.

FIG. 22 illustrates an example of a UCU procedure triggered by the PCF in accordance with embodiments of the present disclosure. In an example embodiment as depicted in FIG. 22, in the non-roaming case the role of the V-PCF is performed by the PCF. For the roaming scenarios, the V-PCF may interact with the AMF. The V-PCF may store the access and mobility control policy information provided to the AMF. The PCF may determine locally that the new status of the UE context requires new policies. The (V-)PCF may determine or makes a policy decision. The (V-)PCF may send Npcf_UpdateNotify comprising AM Policy Association ID associated with the SUPI, Service Area Restrictions, UE-AMBR or RFSP index. The AMF may deploy the Access and mobility related policy information, which may comprise storing the service area restrictions and policy control request trigger of AM policy association, provisioning of the service area restrictions to the UE and provisioning the RFSP index, UE-AMBR and service area restrictions to the NG-RAN.

Figure 23:
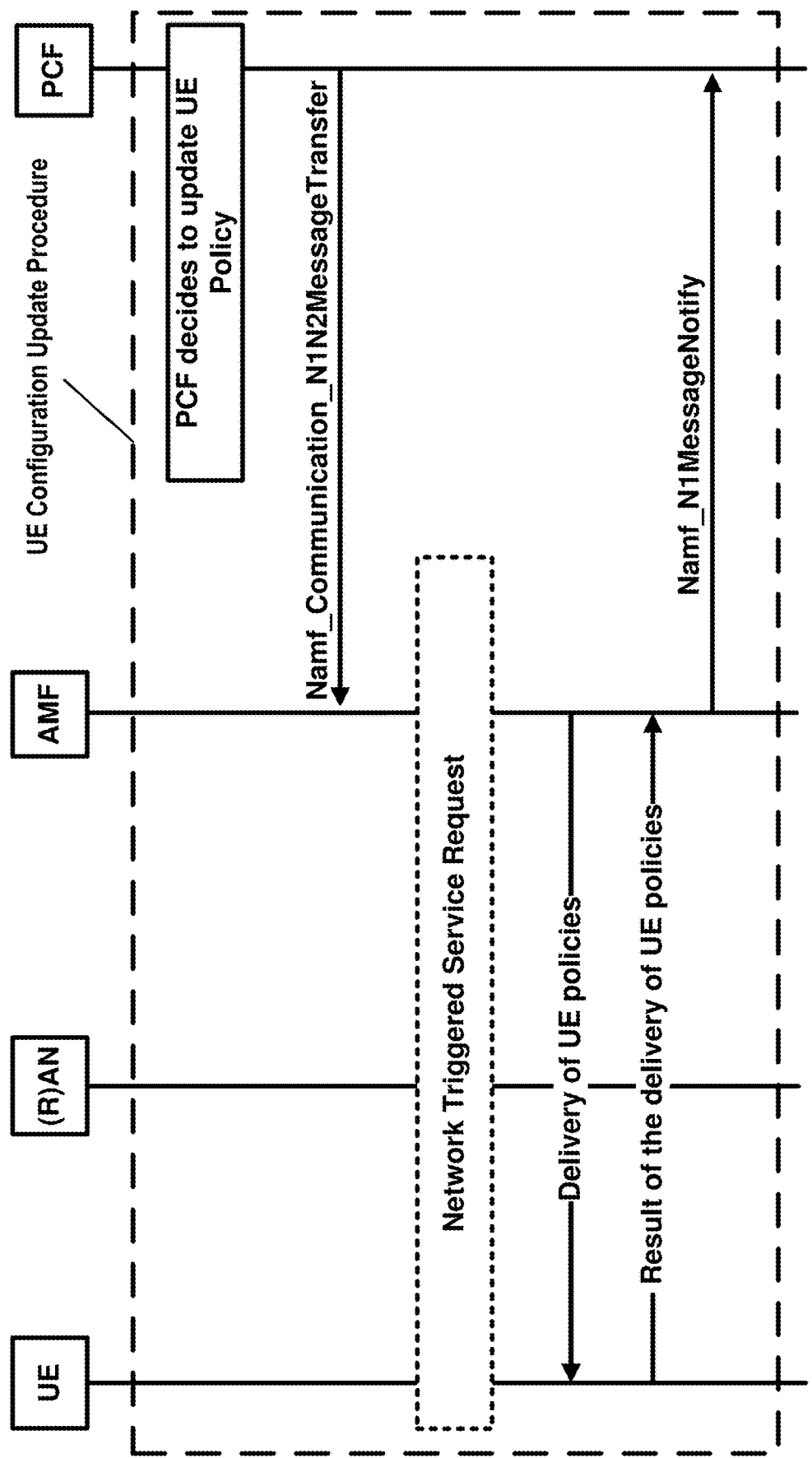
FIG. 23 illustrates an example embodiment of a present disclosure.

In an example as depicted in FIG. 23, when the PCF determines/decides to update UE policy, the UE may employ a UE configuration update (UCU) procedure, a UE policy delivery procedure, and/or the like. The procedures may be based on triggering conditions such as an initial registration or a procedure that requires updating UE policy. In an example, for an initial registration case, the PCF may compare the list of public service identifiers (PSIs) included in the UE access selection and PDU session selection related policy information in Npcf_UEPolicyControl_Create request and may determine whether UE access selection and PDU session selection related policy information have to be updated and be included in the response to the AMF. For the network triggered UE policy update case (e.g. change of TSN related policy/configuration, creation of new TSN related configuration policy, change of UE location, the change of subscribed S-NSSAIs, and/or the like), the PCF may check the latest list of PSIs to decide which UE access selection and/or PDU session selection related policies have to be sent to the UE. The PCF may examine/check if the size of the resulting UE access selection and PDU session selection related policy information exceeds a predefined limit. If the size is under the limit, then UE access selection and PDU Session selection related policy information may be included in a single Namf_Communication_N1N2MessageTransfer service operation. If the size exceeds the predefined limit, the PCF may split the UE access selection and PDU session selection related policy information in smaller, logically independent UE access selection and PDU session selection related policy information, ensuring the size of each is under the predefined limit. One or more URSP, UE access selection, and PDU session selection related policy information may be sent in separated Namf_Communication_N1N2MessageTransfer service operations.

In an example, the PCF may invoke Namf_Communication_ N1N2MessageTransfer service operation provided by the AMF. The message may comprise SUPI, UE Policy Container, URSP, and/or the like. If the UE is registered and reachable by AMF in either 3GPP access or non-3GPP access, the AMF may transfer/send/transmit the UE Policy container to the UE via the registered and reachable access. If the UE is registered in both 3GPP and non-3GPP accesses and reachable on both access and served by the same AMF, the AMF may transfer/send/transmit the UE Policy container to the UE via one of the accesses based on the AMF local policy. If the UE is not reachable by AMF over both 3GPP access and non-3GPP access, the AMF may report to the PCF that the UE policy container may not be delivered to the UE using Namf_Communication_N1N2Transfer- FailureNotification. If the AMF decides/determines to transfer the UE policy container to the UE via 3GPP access, e.g. the UE is registered and reachable by the AMF in 3GPP access, or if the UE is registered and reachable by AMF in both 3GPP and non-3GPP accesses served by the same AMF and the AMF decides to transfer the UE policy container to the UE via 3GPP access based on local policy, and the UE is in CM-IDLE and reachable by AMF in 3GPP access, the AMF may start a paging procedure by sending a paging message and invoke a network triggered service request procedure. Upon reception of paging request, the UE may initiate the UE triggered service request procedure.

In an example embodiment, if the UE is in CM-CONNECTED over 3GPP access or non-3GPP access, the AMF may transfer the UE policy container (UE access selection and PDU session selection related policy information) received from the PCF to the UE. The UE policy container may comprise the URSP.

In an example, the UE may update the UE policy provided by the PCF and may send the result to the AMF. If the AMF received the UE policy container and the PCF subscribed to be notified of the reception of the UE policy container, the AMF may send/forward the response of the UE to the PCF by employing a Namf_N1MessageNotify operation. The PCF may maintain the latest list of PSIs delivered to the UE and may update the latest list of PSIs in the UDR/UDM by invoking Nudr_DM_Update (SUPI, policy data, policy set entry, updated PSI data, and/or the like) service operation.

Figure 24:
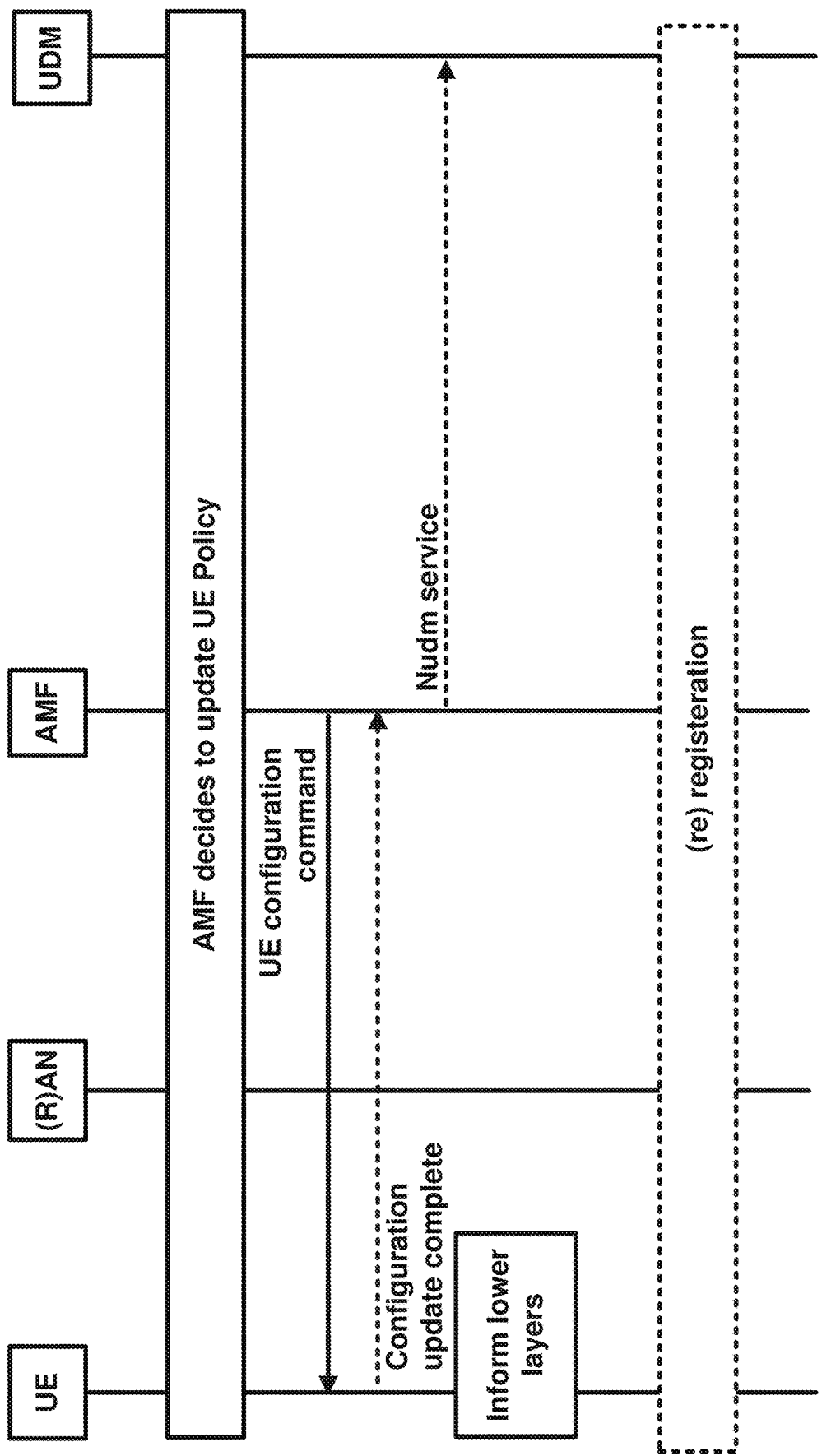
FIG. 24 illustrates an example embodiment of a present disclosure.

FIG. 24 illustrates an example of a UCU procedure triggered by the AMF in accordance with embodiments of the present disclosure. This procedure may be initiated by the AMF when the AMF determines to update access and mobility management related parameters in the UE configuration. This procedure may be employed to trigger UE to perform, based on network indication, either Mobility Registration Update procedure while the UE is in CM-CONNECTED state to modify NAS parameters that require negotiation (e.g. MICO mode) or Mobility Registration Update procedure after the UE enters CM-IDLE state (e.g. for changes to Allowed NSSAI that require re-registration). If a Registration procedure is needed, the AMF may provide an indication to the UE to initiate a Registration procedure. UE configuration update may be sent over the access type (e.g., 3GPP access or non-3GPP access) the UE Configuration Update is applied to, when applicable. If the AMF wants to update NAS parameters in the UE which require UE acknowledgement, then the AMF may provide an indication to the UE of whether the UE may acknowledge the command or not. The AMF may request acknowledgement for NSSAI information (e.g. Allowed NSSAI), 5G-GUTI, TAI List, and Mobility Restrictions, LADN Information, MICO, Operator-defined access category definitions, PLMN-assigned UE Radio Capability ID and SMS subscription.

The AMF may determine the necessity of UE configuration change due to various reasons (e.g., the reception of an MPS indication and determining that the network does not support MPS, UE mobility change, NW policy, reception of Subscriber Data Update Notification from UDM, change of Network Slice configuration, need to assign PLMN-assigned UE Radio Capability ID) or that the UE needs to perform a registration procedure. If a UE is in CM-IDLE, the AMF can wait until the UE is in CM-CONNECTED state or triggers network triggered service request.

In an example, the AMF may check whether network slice configuration needs to be updated by using the Nnssf_NS-Selection_Get service operation and in such case the AMF may compare the stored information with the output from the NSSF to decide whether an update of the UE is required. The AMF may include mobility restriction list in N2 message that delivers UE configuration update command to the UE if the service area restriction for the UE is updated.

In an example, the AMF may send UE configuration update command that may comprise one or more UE parameters (configuration update indication, one or more S-NSSAIs associated with MPS, one or more DNNs associated with MPS, one or more PLMN IDs associated with MPS, one or more NPN IDs associated with MPS, mapping information of one or more parameters with MPS, 5G-GUTI, TAI List, Allowed NSSAI, Mapping Of Allowed NSSAI, Configured NSSAI for the Serving PLMN, Mapping Of Configured NSSAI, rejected S-NSSAIs, NITZ, Mobility Restrictions, LADN Information, MICO, Operator-defined access category definitions, SMS Subscribed Indication, [PLMN-assigned UE Radio Capability ID], [PLMN-assigned UE Radio Capability ID deletion indication]) to UE. Optionally, the AMF may update the rejected S-NSSAIs in the UE Configuration Update command. The AMF may include one or more of 5G-GUTI, TAI List, Allowed NSSAI, Mapping Of Allowed NSSAI, Configured NSSAI for the Serving PLMN, Mapping Of Configured NSSAI, rejected S-NSSAIs, NITZ (Network Identity and Time Zone), Mobility Restrictions parameters, LADN Information, Operator-defined access category definitions, PLMN-assigned UE Radio Capability ID, or SMS Subscribed Indication if the AMF wants to update these NAS parameters without triggering a UE Registration procedure.

In an example, the AMF may include in the UE configuration update command configuration update indication parameters indicating whether:

Network Slicing Subscription Change has occurred;
the UE shall acknowledge the command; and
whether a Registration procedure is requested.

In an example, if the AMF indicates Network Slicing Subscription Change, then the UE may locally erase all the network slicing configuration for all PLMNs and, if applicable, update the configuration for the current PLMN based on any received information. If the AMF also includes in the UE Configuration Update Command message a new Configured NSSAI for the Serving PLMN, then the AMF should also include a new Allowed NSSAI with, if available, the associated Mapping Of Allowed NSSAI, unless the AMF cannot determine the new Allowed NSSAI after the Subscribed S-NSSAI(s) are updated, in which case the AMF does not include in the UE configuration update command message any allowed NSSAI.

If the AMF provided the NG-RAN with updated Mobility Restrictions, the NG-RAN may trigger a handover procedure or the AN release procedure. If the UE Configuration Update Indication requires acknowledgement of the UE Configuration Update Command, then the UE may send a UE Configuration Update complete message to the AMF. If the Configuration Update Indication is included in the UE Configuration Update Command message, and it requires a Registration procedure, depending on the other NAS parameters included in the UE Configuration Update command, the UE may perform a registration request procedure.

FIG. 25 illustrates an example of a configuration parameter or URSP (and example elements) in accordance with embodiments of the present disclosure. A URSP rule may comprise a traffic descriptor that determines when the rule is applicable. The URSP rule may be determined to be applicable when one or more components in the traffic descriptor matches the corresponding information from a request by the higher layer layers of the UE or an application.

The URSP rule may comprise a list of route selection descriptors comprising one or multiple route selection descriptors having a different route selection descriptor precedence value. A route selection descriptor may comprise one or more of the following components: session and service continuity (SSC) mode that Indicates that the traffic of the matching application may be routed via a PDU Session supporting the included SSC Mode; network slice selection indicating that the traffic of the matching application may be routed via a PDU Session supporting one or more of the included S-NSSAIs; DNN selection indicating that the traffic of the matching application may be routed via a PDU session supporting any of the included DNNs. When DNN is used in traffic descriptor, corresponding route selection descriptor of the rule may or may not include DNN selection component; PDU session type selection indicating that the traffic of matching application may be routed via a PDU session supporting the included PDU session type; Non-Seamless offload indication may comprise indicating that traffic of the matching application is to be offloaded to non-3GPP access outside of a PDU Session when the rule is applied; access type preference may be employed if the UE needs to establish a PDU session when the rule is applied, this indicates the access type (3GPP or non-3GPP or multi-access) on which the PDU Session should be established. The type "Multi-Access" may indicate that the PDU Session should be established as a MA PDU session, using both 3GPP access and non-3GPP access.

In an example, in the case of network rejection of the PDU session establishment request, the UE may trigger a new PDU session establishment based on the rejection cause and the URSP policy. When the PCF provisions URSP rules to the UE, one URSP rule with a "match all" traffic descriptor may be included. The URSP rule with the "match all" traffic descriptor may be employed to route the traffic of applications which do not match any other URSP rules and may be evaluated as the last URSP rule, e.g., with lowest priority. There may be one route selection descriptor in a URSP rule. the route selection descriptor in this URSP rule includes at most one value for each route selection component.

In an example, as depicted in FIG. 25, the URSP may comprise a traffic descriptor and a traffic descriptor component type identifier. The traffic descriptor component type identifier may comprise a connection capabilities type. The connection capabilities type may be IMS, MMS, SUPL, MPS or MPS for DTS. In an example, the UE may determine to use the URSP rule associated with the MPS (or MPS for DTS) connection capabilities type. The rule or policy associated with the MPS connection capabilities may comprise a DNN, S-NSSAI, PDU session type(s), and or the like. For example, when the UE determines to send a PDU session establishment request message to the network for a PDU session that requires MPS priority treatment, the UE may send a NAS message (PDU session establishment request message) comprising the DNN and/or the S-NS-SAI(s) associated with connection capabilities type identifier of MPS.

In an example, a UE may be provisioned with URSP rules by PCF of the HPLMN. When the UE is roaming, the PCF in the HPLMN may update the URSP rule in the UE. For URSP rules, the UE may support the provisioning from the PCF in the HPLMN. In an example, the UE may be also pre-configured with URSP rules (e.g., by the operator) when the US is an MPS subscribed UE. When the UE does not have MPS subscription and is not preconfigured, the URSP may be provided by the network.

UE procedure for associating applications to PDU sessions based on URSP may comprise the following. For every newly detected application the UE evaluates the URSP rules in the order of Rule Precedence and determines if the application is matching the Traffic descriptor of any URSP rule. When a URSP rule is determined to be applicable for a given application or a connection capabilities type (e.g., MPS), the UE may select a route selection descriptor within the URSP rule in the order of the route selection descriptor precedence. When a valid route selection descriptor is found, the UE may determine if there is an existing PDU session that matches all components in the selected route selection descriptor. The UE compares the components of the selected route selection descriptor with the existing PDU session(s) as follows. For a component which contains one value (e.g., SSC mode), the value of the PDU session may be identical to the value specified in the route selection descriptor. For a component which contains a list of values (e.g., Network Slice Selection), the value of the PDU Session may be identical to one of the values specified in the route selection descriptor. When some component(s) are not present in the route selection descriptor, a PDU session may be considered matching if it was established without including the missing component(s) in the PDU Session Establishment Request. When the route selection descriptor includes a time window or a location criteria, the PDU session may be considered matching only if the PDU session is associated with a route selection descriptor (RSD) that has the same time window or a location criteria validity conditions. When a matching PDU Session exists the UE associates the application to the existing PDU Session, e.g., route the traffic of the detected application on this PDU Session. If the UE determines that there is more than one existing PDU Session which matches (e.g. the selected Route Selection Descriptor only specifies the network slice selection, while there are multiple existing PDU Sessions matching the network slice selection with different DNNs), it is up to UE implementation to select one of them to use.

In an example, if none of the existing PDU sessions match, the UE may attempt to establish a new PDU session using the values specified by the selected route selection descriptor associated with MPS. If the PDU session establishment request is accepted, the UE associates the application to this new PDU Session. If the PDU session establishment request is rejected, based on the rejection cause, the UE selects another combination of values in the currently selected route selection descriptor if any other value for the rejected component in the same route selection description can be used. Otherwise, the UE may select the next route selection descriptor in the order of the route selection descriptor precedence, if any. If the UE fails to establish a PDU session with any of the route selection descriptors, it tries other URSP rules in the order of rule precedence with matching traffic descriptors, except the URSP rule with the "match-all" Traffic descriptor, if any.

In an example, the UE may receive the updated URSP rules and (re-)evaluates their validities in a timely manner when certain conditions are met, for example:

the URSP is updated by the PCF;
the UE moves from EPC to 5GC;
change of Allowed NSSAI or Configured NSSAI;
change of LADN DNN availability;
UE registers over 3GPP or non-3GPP access;
UE establishes connection to a WLAN access.

The route selection descriptor of a URSP rule may be considered valid if on or more of the following conditions are fulfilled:

If any S-NSSAI(s) is present, the S-NSSAI(s) is in the Allowed NSSAI for the non-roaming case and in the mapping of the Allowed NSSAI to HPLMN S-NSSAI(s) for the roaming case.

If any DNN is present and the DNN is an LADN DNN, the UE is in the area of availability of this LADN.

If Access Type preference is present and set to Multi-Access, the UE supports ATSSS.

If a Time Window is present and the time matches what is indicated in the Time Window.

If a Location Criteria is present and the UE location matches what is indicated in the Location Criteria.

When URSP rules are updated or their validity according to the conditions above change, the association of existing applications to PDU Sessions may need to be re-evaluated. The UE may also re-evaluate the application to PDU Session association due to the following reasons:

periodic re-evaluation based on UE implementation;
an existing PDU Session that is used for routing traffic of an application based on a URSP rule is released;
The expiration of time window in route selection validation criteria, e.g., the expiration of time window, or UE's location no longer matches the location criteria.

If the re-evaluation leads to a change of the application to PDU Session association, e.g., the application is to be associated with another PDU session or a new PDU session needs to be established, the UE may enforce or implement such changes in a timely manner based on implementation, e.g., immediately or when UE enters CM-IDLE state. If the selected Route Selection Descriptor contains a Non-Seamless Offload indication and the UE has established a connection to a WLAN access, the UE routes the traffic matching the Traffic descriptor of the URSP rule via the WLAN access outside of a PDU session.

Figure 26:
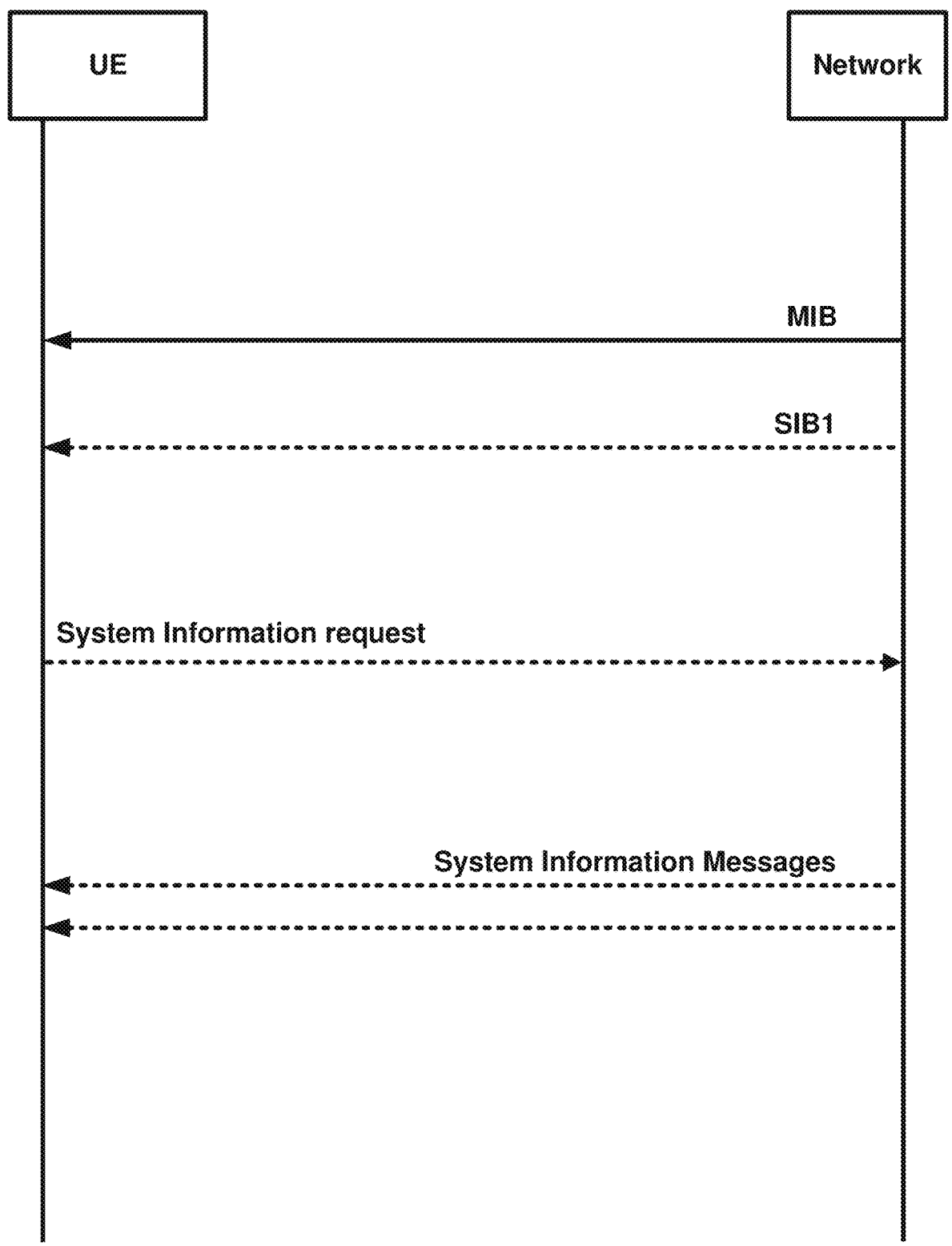
FIG. 26 illustrates an example embodiment of a present disclosure.

FIG. 26 illustrates an example of a configuring a UE via system information block (SIB) in accordance with embodiments of the present disclosure. SIB may be broadcast by a cell or a RAN node to one or more UEs within a cell area. In an example embodiment as depicted in FIG. 26, system information (SI) may be divided into the MIB and a number of SIBs and posSIBs. The MIB may be transmitted on a broadcast BCH with a periodicity of 80 ms and repetitions made within 80 ms and it may comprise parameters that are needed to acquire SIB1 from the cell. The first transmission of the MIB may be scheduled in subframes as defined and repetitions are scheduled according to the period of synchronization signal block SSB. The SIB1 may be transmitted on a downlink shared channel DL-SCH with a periodicity of 160 ms and variable transmission repetition periodicity within 160 ms. SIBs other than SIB1 and posSIBs may be carried in SystemInformation (SI) messages, which are transmitted on the DL-SCH. One or more SI message may be transmitted within periodically occurring time domain windows (referred to as SI-windows with same length for all SI messages). A cell specific SIB may be applicable within a cell that provides the SIB while the area specific SIB may be applicable within an area referred to as SI area, which may comprise of one or several cells and is identified by systemInformationAreaID. The mapping of SIBs to SI messages may be configured in schedulingInfoList, while the mapping of posSIBs to SI messages may be configured in posSI-SchedulingInfoList. For a UE in RRC_CONNECTED, the network may provide system information through dedicated signalling using the RRCReconfiguration message, e.g., if the UE has an active BWP with no common search space configured to monitor system information or paging.

In an example, the UE may apply or employ SI acquisition procedure to acquire the AS, NAS- and positioning assistance data information. The procedure may apply to UEs in RRC_IDLE, in RRC_INACTIVE and in RRC_CONNECTED. The UE in RRC_IDLE and RRC_INACTIVE may determine/ensure of having a valid version of (at least) the MIB, SIB1 through SIB4, SIB5 (if the UE supports E-UTRA) and SIB11 (if the UE is configured for idle/inactive measurements). In an example, the UE may apply the SI acquisition procedure upon cell selection (e.g., upon power on), cell-reselection, return from out of coverage, after reconfiguration with sync completion, after entering the network from another RAT, upon receiving an indication that the system information has changed, upon receiving a PWS notification, upon receiving a positioning request from upper layers, whenever the UE does not have a valid version of a stored SIB, and/or the like. When the UE acquires a MIB or a SIB1 or an SI message in a serving cell and if the UE stores the acquired SIB, then the UE may store the associated area Scope, if present, a first PLMN-Identity in the PLMN-IdentityInfoList for non-NPN-only cells, the first NPN-Identity (SNPN identity in case of SNPN, or PNI-NPN identity in case of PNI-NPN) in the NPN-IdentityInfoList for NPN-only cells, the cellIdentity, the systemInformationAreaID, if present, and the valueTag, if present, as indicated in the si-SchedulingInfo for the SIB. The UE may use a valid stored version of the SI except MIB, SIB1, SIB6, SIB7 or SIB8 e.g., after cell re-selection, upon return from out of coverage or after the reception of SI change indication.

In an example, the SI or SI messages may comprise a list of network names, human readable network names (HRNN), a list of NPN (SNPN, PNI-NPN, and/or the like) that support MPS. In an example, the UE may receive from a cell of RAN node the SI that comprises parameters for cell selection, network selection, PLMN selection, NPN selection, and/or the like. The UE may receive SIB1 or other SIBs. The UE may employ SIB1 elements to determine one or more parameters for accessing the network that provides MPS support. The SIB1 may be employed by configuring an element of SIB1 (e.g., an information element, a field, and/or the like). The element may be cellAccessRelatedInfo information element as depicted in FIG. 27 and FIG. 28. The UE may employ the SIBs (e.g., SIB1) to perform a cell selection, or cell reselection when the UE determines that MPS priority treatment may be required. The SI received by the UE may configure the UE to perform an RRC request with a cause indicating MPS priority treatment such as mps-priorityAccess cause, high priority access, and/or the like. The UE may employ the SIB, SI, or other SIBs to determine a PLMN ID, NPN ID, and/or the like that supports MPS.

In an example, the UE may receive the SI, SIB1 in response to an access request or registration with a network with the MPS indication, MPS for DTS indication, MPS-unique identifier, MPS code, and/or the like. The network may determine to provide configuration parameters for accessing MPS priority treatment via SIB IE, or other SI.

Figure 29:
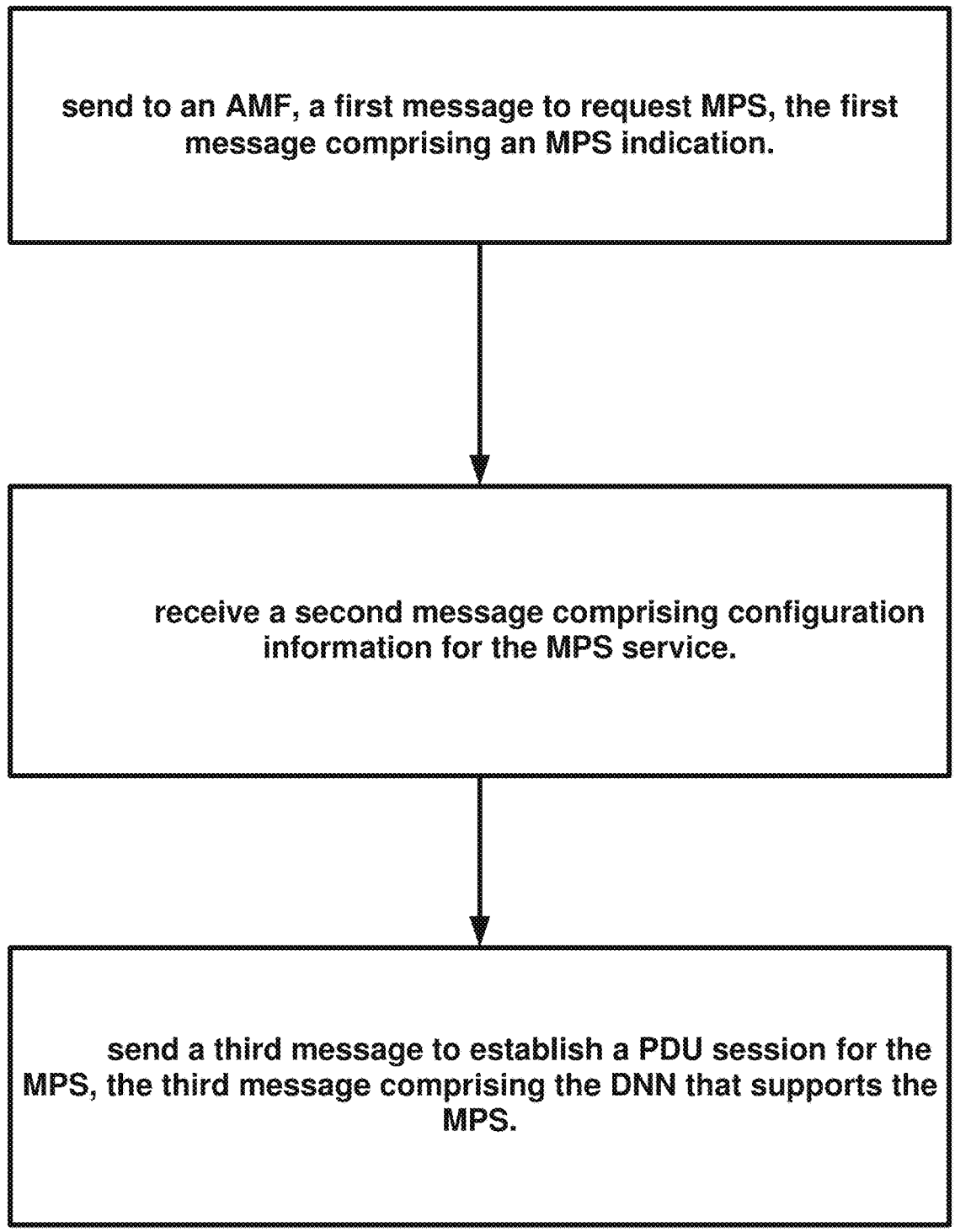
FIG. 29 illustrates an example flow chart of a present disclosure.
Figure 30:
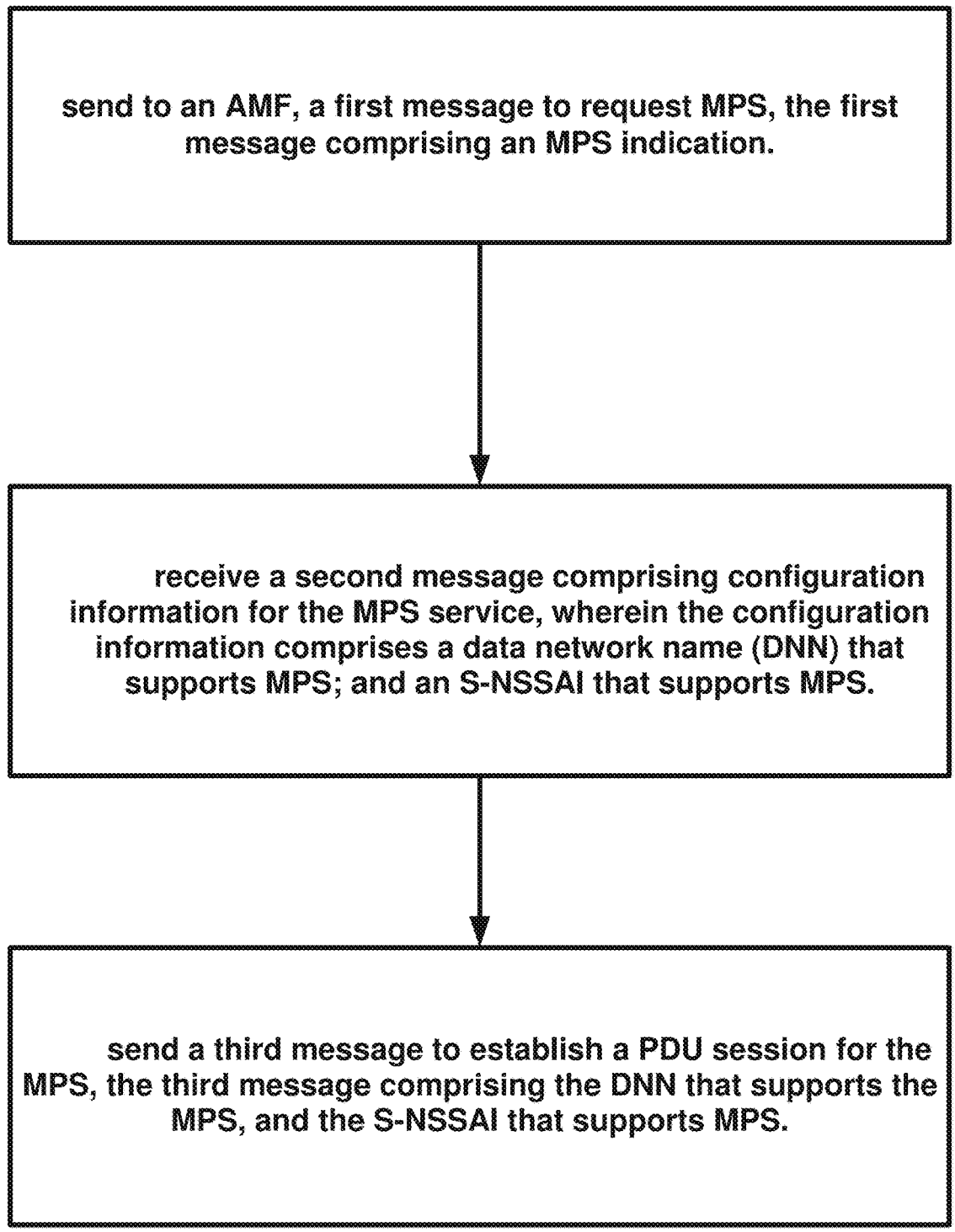
FIG. 30 illustrates an example flow chart of a present disclosure.

In an example embodiment as depicted in FIG. 29 and FIG. 30, a wireless device may send to an access and mobility management function (AMF), a first message to request multimedia priority service (MPS). The first message may comprise an MPS indication. The wireless device may receive from the AMF, a second message comprising configuration information for the MPS service. The configuration information may comprise a data network name (DNN) that supports MPS. The configuration information may comprise a single network slice assistance information (S-NSSAI) that supports MPS. The wireless device may send to the AMF a third message to establish a packet data unit (PDU) session for the MPS. The third message may comprise the DNN that supports the MPS. The Third message may comprise the S-NSSAI that supports MPS.

In an example, the first message may comprise an MPS credential of an MPS user. In an example, the MPS indication is a registration type. In an example, the AMF may send to the wireless device a registration accept message indicating that a network supports MPS. In an example, the AMF may send to the wireless device a registration accept message indicating that a network does not supports MPS. In an example, the registration accept message may comprise a DNN that supports MPS service. In an example, the registration accept message may comprise a S-NSSAI that supports MPS. In an example, the wireless device may send to the AMF a second request message comprising the DNN that supports MPS service. In an example, the configuration information may be a user equipment route selection policy (URSP). In an example, the URSP may comprise a set of rules for selecting one or more parameter of a PDU session based on a connection type or connection capabilities. In an example, the connection type may be an MPS connection type. In an example, the set of rules may comprise at least one of a DNN associated with the connection type being the MPS connection type, a S-NSSAI associated with the connection type being the MPS connection type, and/or the like. In an example, the wireless device may send to the AMF, a second message that may comprise the DNN associated with the connection type being the MPS connection type, the S-NSSAI associated with the connection type being the MPS connection type, and/or the like. In an example, the second message may be a registration request message, a service request message, a PDU session establishment request message, or a PDU session modification request message. In an example, the URSP may comprise a traffic descriptor associated with an MPS-unique identifier (or an MPS code). In an example, the traffic descriptor may be associated with a set of rules comprising at least one of: a DNN associated with the traffic descriptor associated with the MPS-unique identifier; and a S-NSSAI associated with the traffic descriptor associated with the MPS-unique identifier. In an example, the AMF may receive from a PCF, the configuration information. In an example, the wireless device may receive from the AMF a reject message comprising a cause indicating MPS is not supported by a network. In an example, the reject message may comprise at least one of: a PLMN identifier that supports MPS, an NPN identifier that supports MPS, and/or the like. In an example, the wireless device may receive from a network a system information block comprising a list of PLMNs that support MPS, a list of NPNs that support MPS, and/or the like. In an example, the wireless device may receive from a base station a SIB message for unified access control indicating barring information for one or more: DNNs, S-NSSAIs, and/or the like. In an example, the barring information may indicate that the DNN and the one or more S-NSSAIs are not subject to barring. In an example, the first message may comprise an MPS credential of an MPS service user. In an example, the configuration parameters may be determined by the network based on one or more of: an MPS credential of an MPS service user, an MPS-unique identifier, an MPS code, and/or the like.

Figure 31:
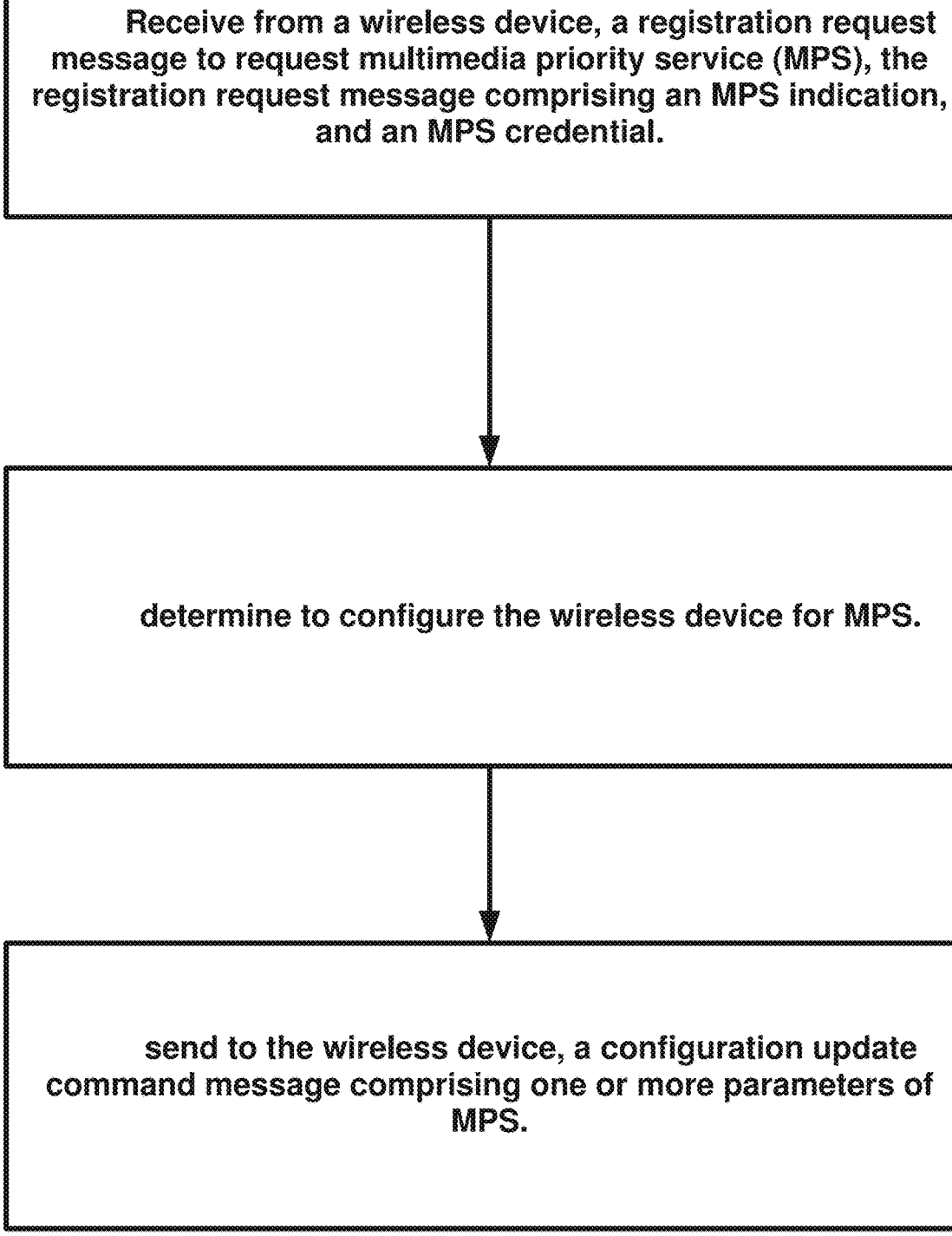
FIG. 31 illustrates an example flow chart of a present disclosure.

In an example embodiment as depicted in FIG. 31, an access and mobility management function (AMF) may receive from a wireless device, a registration request message to request multimedia priority service (MPS). In an example, the registration request message may comprise an MPS indication, an MPS credential, and/or the like. The AMF may determine to configure the wireless device for MPS. The AMF may send to the wireless device, a configuration update command message comprising one or more parameters of MPS.

In an example embodiment. the one or more parameters of MPS may comprise a DNN that supports MPS, a S-NSSAI that supports MPS, a network identifier that supports MPS, and/or the like. In an example, the AMF may receive from a PCF a request to update the one or more parameters of MPS.

Figure 32:
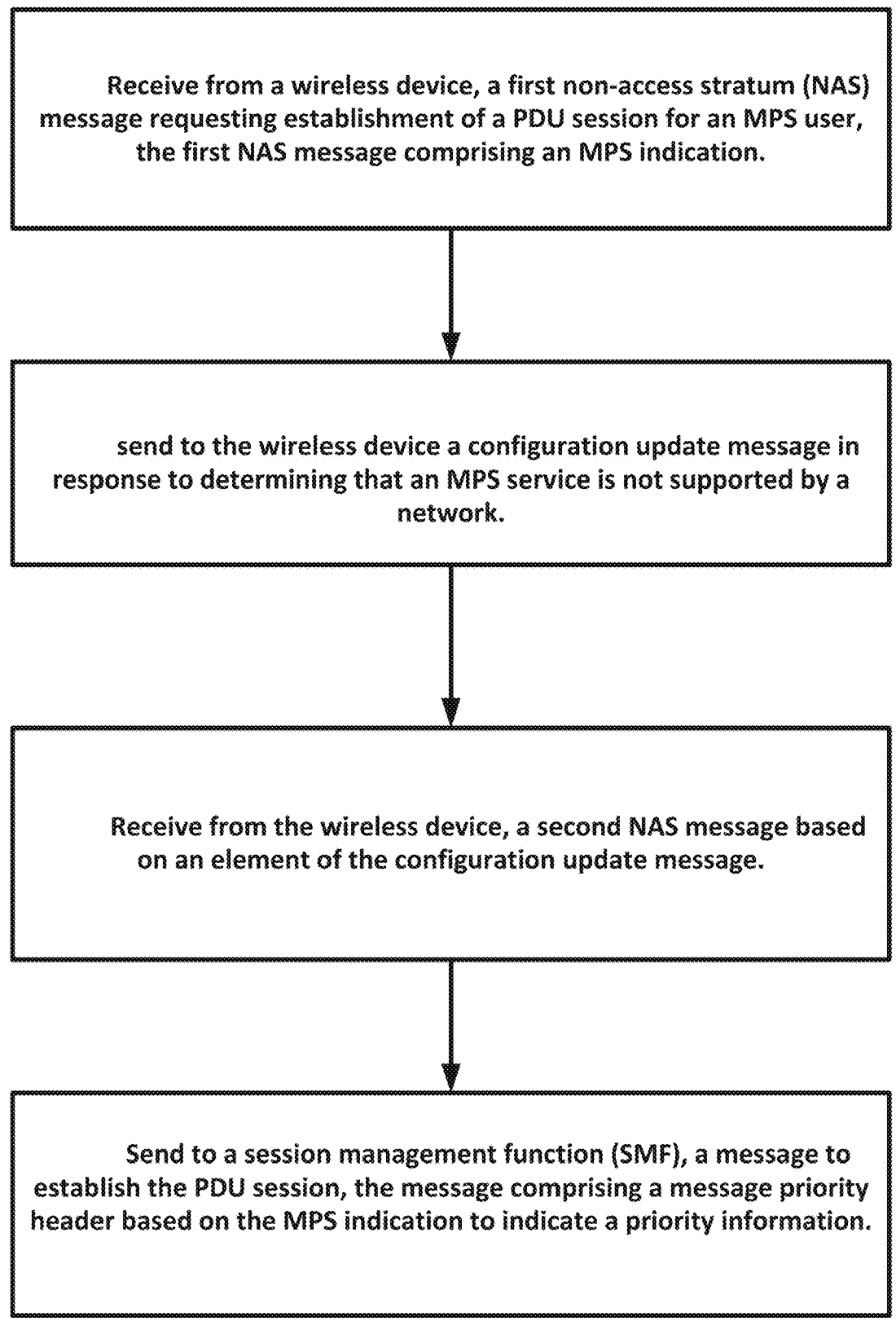
FIG. 32 illustrates an example flow chart of a present disclosure.

In an example embodiment as depicted in FIG. 32, an access and mobility management function (AMF) may receive from a wireless device, a first non-access stratum (NAS) message requesting establishment of a PDU session for an MPS user. The first NAS message may comprise an MPS indication. In an example, the AMF may send to the wireless device a configuration update message in response to determining that an MPS service is not supported by a network. The AMF may receive from the wireless device, a second NAS message based on an element of the configuration update message. The AMF may send to a session management function (SMF), a message to establish the PDU session. The message may comprise a message priority header based on the MPS indication to indicate a priority information.

In an example embodiment, the configuration update message may comprise at least one of a data network name associate with an MPS service, an S-NSSAI associated with the MPS service, and/or the like.

According to various embodiments, one or more devices such as, for example, a wireless device, off-network wireless device, a base station, a core network device, and/or the like, may be employed in a system. One or more of the devices may be configured to perform particular operations or actions by virtue of having software, firmware, hardware, or a combination of them installed on the one or more of the devices, that in operation causes or cause the one or more devices to perform the actions. One or more computer programs can be configured to perform particular operations or actions by virtue of including instructions that, when executed by data processing apparatus, cause the apparatus to perform the actions. Embodiments of example actions are illustrated in the accompanying figures and specification. Features from various embodiments may be combined to create yet further embodiments.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various Examples. If A and B are sets and every element of A is an element of B, A is called a subset of B. In this specification, only non-empty sets and subsets are considered. For example, possible subsets of B={cell1, cell2} are: {cell1}, {cell2}, and {can, cell2}.

In this specification, various Examples are disclosed. Limitations, features, and/or elements from the disclosed example Examples may be combined to create further Examples within the scope of the disclosure.

In this specification, various Examples are disclosed. Limitations, features, and/or elements from the disclosed example Examples may be combined to create further Examples within the scope of the disclosure.

In this specification, parameters (Information elements: IEs) may comprise one or more objects, and one of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example, when one or more messages comprise a plurality of parameters, it implies that a parameter in the plurality of parameters is in at least one of the one or more messages, but does not have to be in one of the one or more messages.

Many of the elements described in the disclosed Examples may be implemented as modules. A module is defined here as an isolatable element that performs a defined function and has a defined interface to other elements. The modules described in this disclosure may be implemented in hardware, software in combination with hardware, firmware, wetware (e.g. hardware with a biological element) or a combination thereof, some of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various Examples have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative Examples. Thus, the present Examples should not be limited by any of the above described exemplary Examples. In particular, it should be noted that, for example purposes, the above explanation has focused on the example(s) using 5G AN. However, one skilled in the art will recognize that Examples of the invention may be implemented in a system comprising one or more legacy systems or LTE. The disclosed methods and systems may be implemented in wireless or wireline systems. The features of various Examples presented in this invention may be combined. One or many features (method or system) of one Example may be implemented in other Examples. A limited number of example combinations are shown to indicate to one skilled in the art the possibility of features that may be combined in various Examples to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some examples.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
    sending, by an access and mobility management function (AMF) to a wireless device, a registration accept message comprising one or more configuration parameters of the wireless device;
    sending, by the AMF to the wireless device, a wireless device configuration update command comprising a parameter for a multimedia priority service (MPS) configuration of the wireless device;
    receiving, by the AMF from the wireless device, a packet data unit (PDU) session establishment request; and
    in response to the PDU session establishment request, sending, by the AMF to a session management function (SMF), a create session management context request message comprising a header indicating priority information of the wireless device.

2. The method of claim 1, wherein the priority information indicates that signaling associated with the wireless device is exempt from non-access stratum (NAS) level congestion control.

3. The method of claim 1, wherein the PDU session establishment request indicates that the session is for MPS.

4. The method of claim 1, wherein the sending the create session management context request message is based on the wireless device being associated with the MPS configuration.

5. The method of claim 1, wherein the wireless device configuration update command updates the one or more configuration parameters.

6. The method of claim 1, wherein the one or more configuration parameters comprise one or more of:
    a data network name (DNN); and
    a slice identifier of a network slice.

7. The method of claim 1, further comprising sending, to the wireless device, a connection capability indication indicating network support for a connection of the wireless device for the MPS.

8. The method of claim 1, further comprising sending, to the wireless device, a user equipment route selection policy (URSP) comprising one or more of:
    a data network name (DNN) that supports the MPS; and
    a slice identifier of a slice that supports the MPS.

9. The method of claim 8, wherein the URSP comprises a traffic descriptor associated with one or more of:
    an MPS-unique identifier; and
    an MPS code.

10. The method of claim 9, wherein the traffic descriptor is associated with a set of rules comprising one or more of:
    a data network name (DNN) associated with the traffic descriptor associated with the MPS-unique identifier; and
    a slice identifier of a network slice associated with the traffic descriptor associated with the MPS-unique identifier.

11. An access and mobility management function (AMF) comprising:
    one or more processors; and
    memory storing instructions that, when executed by the one or more processors, cause the AMF to:
    send, to a wireless device, a registration accept message comprising one or more configuration parameters of the wireless device;
    send, to the wireless device, a wireless device configuration update command comprising a parameter for a multimedia priority service (MPS) configuration of the wireless device;

receive, from the wireless device, a packet data unit (PDU) session establishment request; and in response to the PDU session establishment request, send, to a session management function (SMF), a create session management context request message comprising a header indicating priority information of the wireless device.

12. The AMF of claim 11, wherein the priority information indicates that signaling associated with the wireless device is exempt from non-access stratum (NAS) level congestion control.

13. The AMF of claim 11, wherein the PDU session establishment request indicates that the session is for MPS.

14. The AMF of claim 11, wherein the sending the create session management context request message is based on the wireless device being associated with the MPS configuration.

15. The AMF of claim 11, wherein the wireless device configuration update command updates the one or more configuration parameters.

16. The AMF of claim 11, wherein the one or more configuration parameters comprise one or more of:
a data network name (DNN); and
a slice identifier of a network slice.

17. The AMF of claim 11, wherein the instructions further cause the AMF to send, to the wireless device, a connection capability indication indicating network support for a connection of the wireless device for the MPS.

18. The AMF of claim 11, wherein the instructions further cause the AMF to send, to the wireless device, a user equipment route selection policy (URSP) comprising one or more of:
a data network name (DNN) that supports the MPS; and
a slice identifier of a slice that supports the MPS.

19. The AMF of claim 18, wherein the URSP comprises a traffic descriptor associated with one or more of:
an MPS-unique identifier; and
an MPS code.

20. A system comprising:
an access and mobility management function (AMF) comprising:
one or more processors; and
memory storing instructions that, when executed by the one or more processors, cause the AMF to:
send, to a wireless device, a registration accept message comprising one or more configuration parameters of the wireless device;
send, to the wireless device, a wireless device configuration update command comprising a parameter for a multimedia priority service (MPS) configuration of the wireless device;
receive, from the wireless device, a packet data unit (PDU) session establishment request; and
in response to the PDU session establishment request, send, to a session management function (SMF), a create session management context request message comprising a header indicating priority information of the wireless device; and
the wireless device, wherein the wireless device comprises:
one or more second processors; and
second memory storing instructions that, when executed by the one or more processors, cause the wireless device to:
receive, from the AMF, the registration accept message;
receive, from the AMF, the wireless device configuration update command; and
send, to the AMF, the PDU session establishment request.

* * * * *